July 14, 1953 C. R. ROCHE 2,645,137
AUTOMATIC TRANSMISSION

Filed May 16, 1947 7 Sheets-Sheet 1

INVENTOR.
Clifton R. Roche.
BY
Barnes, Dickey & Pierce
ATTORNEYS.

July 14, 1953 C. R. ROCHE 2,645,137
AUTOMATIC TRANSMISSION
Filed May 16, 1947 7 Sheets-Sheet 2

INVENTOR.
Clifton R. Roche.
BY
Barness Dickey & Pierce
ATTORNEYS.

INVENTOR.
Clifton R. Roche.
BY
Barnes, Dickey - Pierce
ATTORNEYS.

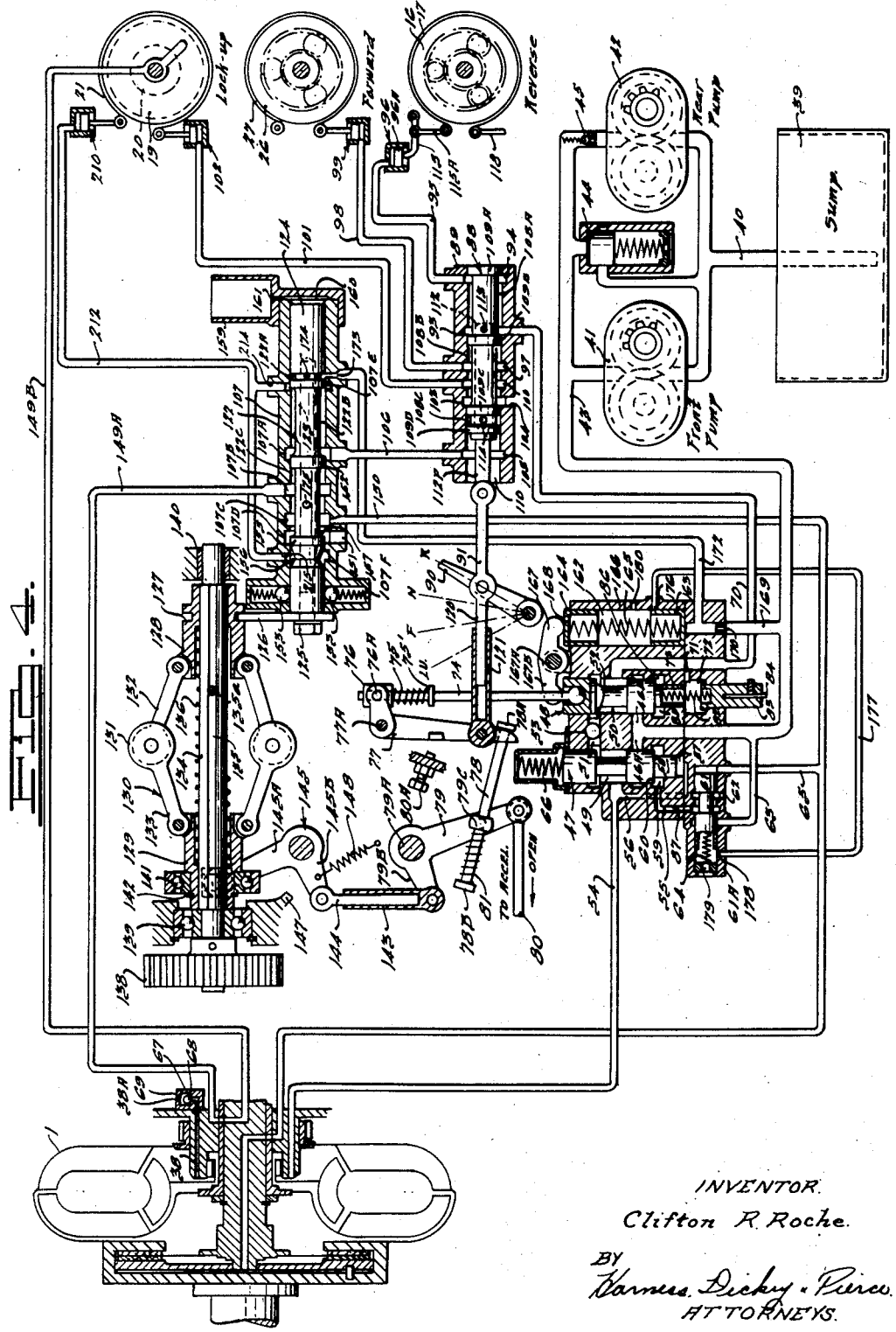

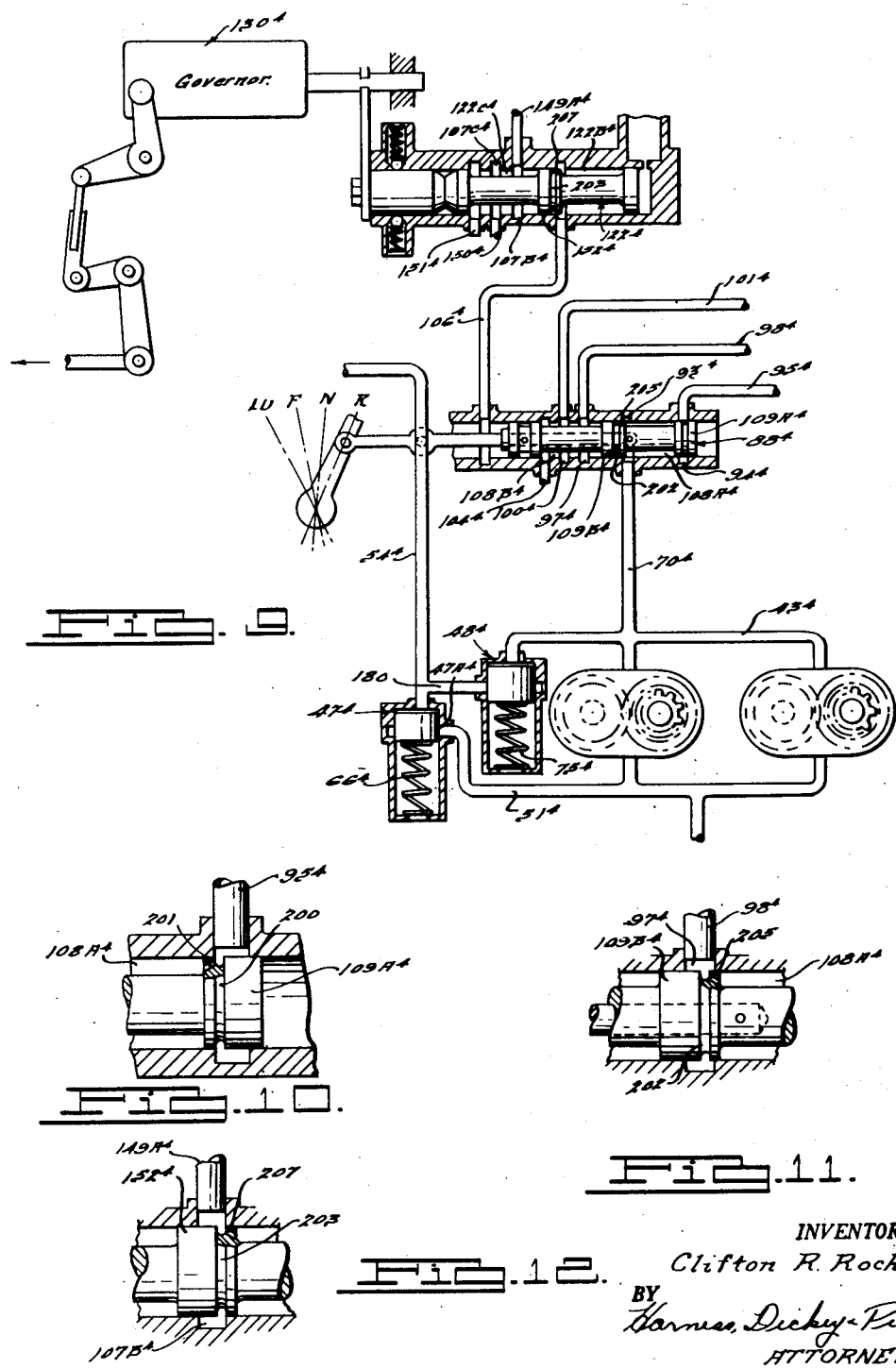

July 14, 1953
C. R. ROCHE
2,645,137
AUTOMATIC TRANSMISSION
Filed May 16, 1947
7 Sheets-Sheet 6
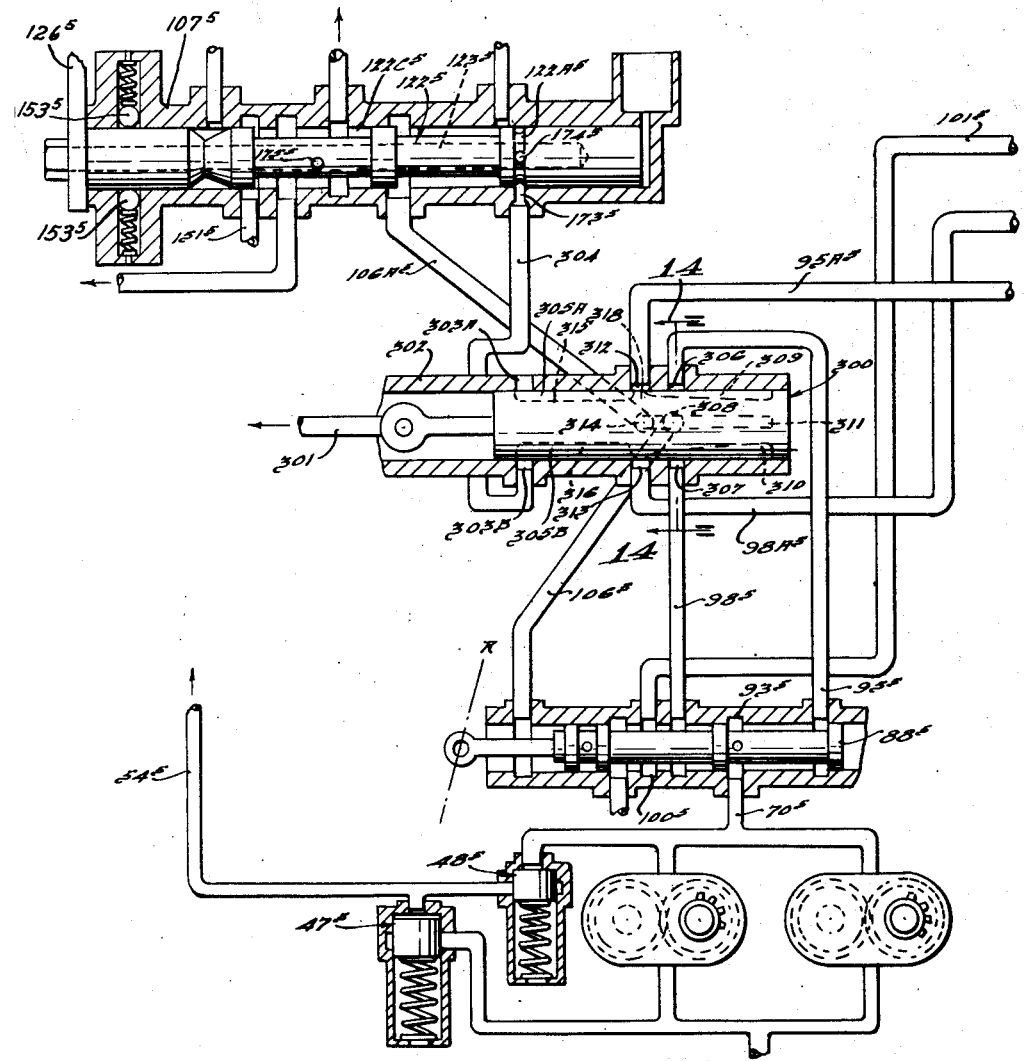
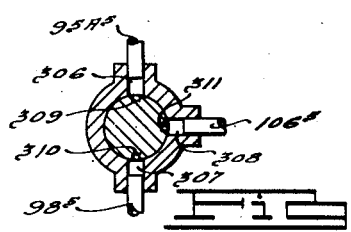
INVENTOR.
Clifton R. Roche.
BY
Harness, Dickey, Pierce
ATTORNEYS.

July 14, 1953 C. R. ROCHE 2,645,137
AUTOMATIC TRANSMISSION
Filed May 16, 1947 7 Sheets-Sheet 7

INVENTOR.
Clifton R. Roche.
BY
Harness, Dickey & Pierce
ATTORNEYS.

UNITED STATES PATENT OFFICE 2,645,137

AUTOMATIC TRANSMISSION

Clifton R. Roche, Los Angeles, Calif.

Application May 16, 1947, Serial No. 748,382

41 Claims. (Cl. 74—732)

The present invention relates to change speed power transmissions, particularly for automotive vehicles. The objects of the invention may be broadly summarized as comprising the provision of an automatically variable transmission which is both improved in its operating characteristics and simplified in its construction.

It is an object of the present invention to provide such a transmission incorporating hydraulic torque converting means of the Foettinger type and also incorporating torque converting means of the planetary gear type, these two types of torque converting means being combined with a novel coacting control system and incorporated in a mechanism of extremely simple and compact construction, which nevertheless provides the equivalent of four speed ratios, with added flexibility not obtainable, even in a four speed transmission, when gears are relied upon entirely for torque conversion, the parts of my improved transmission being so arranged that in normal use thereof the driving ratio is automatically selected in accordance with the speed and load conditions imposed upon the engine in its propulsion of the vehicle.

A further object is to incorporate improved means whereby the driver may exercise effective supervisory control, which nullifies or overrules the automatic action of the transmission, whenever desired, as for example when the driver wishes to anticipate road conditions which he perceives, but which the vehicle has not yet encountered, or where the driver desires to lock the transmission in a reduced speed positive two-way driving ratio, as for descending hills.

It is also an object of the present invention to provide such a transmission system incorporating planetary gears and overrunning clutches, and including a very simple and practical lock-up system for holding the transmission in a reduced speed two-way drive, which lock-up system is easily releasable and engageable at will and does not employ synchronizers, dog clutches or other complicated controls or elaborate and expensive parts. A related object is to provide such a lock-up system which does not require the actuation of clutches in accurately timed relation with respect to one another or with respect to synchronizers or other such devices and which, by the elimination of synchronizers, positive toothed clutches and the like, affords a construction more compact as well as simpler and less expensive to construct than presently known means employed for similar purposes.

Another object is to provide such a transmission having reversing means affording a torque multiplying reverse drive of a suitable ratio, which reverse drive employs no additional gearing over and above that provided for the forward speed drives, the arrangement also being such that no special free wheeling lock-up means is required during reverse drive.

Another object is to provide such an improved automatic transmission having a hydrodynamic torque converter of the Foettinger type and which incorporates means for eliminating the undesirable effects of drag or transmission of torque through the hydraulic torque converter when the transmission is in neutral. By attainment of the last-mentioned object, an important advantage is imparted to the transmission in that manual shifting from forward to reverse is easily effected without clash.

It is also an object of the present invention to provide an improved hydrodynamic torque converter which at desired times functions as a simple hydraulic clutch of the Foettinger type, and to incorporate in the controlling system for the hydrodynamic assembly means whereby the tendency of such assembly to cause objectionable drag is entirely eliminated even when, during automatic operation, the vehicle is standing with the engine running and the drive selecting or supervisory control means set in a driving position (either forward or reverse). Thus although the vehicle may be ready to move as soon as the engine is accelerated above idling speed by the simple act of depressing the accelerator pedal, there is no tendency of the vehicle to creep. It will be recognized by those skilled in the art that an objectionable tendency frequently encountered in automatic transmissions is the creeping effect commonly present under the conditions outlined. This tendency, with automatic transmissions of types commonly used and known, often requires the driver to keep one foot on the brake pedal, to prevent the car from crawling forward when the driver wishes the vehicle to stand still in traffic with the controls set for an immediate start upon opening of the throttle. The driver is thus required to simultaneously manipulate the accelerator and the brake pedal, requiring much more concentrated effort, and imposing wear upon the braking system. My improved transmission completely eliminates this objectionable aspect, by mechanism of very simple, inexpensive, and reliable character. In my improved transmission, when the accelerator pedal is completely released, all torque at the output of the transmission resulting from frictional drag within the hydrodynamic clutching and torque converting assembly is completely eliminated, and no drive can be transmitted from the engine to the driving wheels of the vehicle. Thus the objectionable tendency of the vehicle to crawl or creep in the manner referred to is done away with, and the driver is not required to use the brake while driving in traffic except for its normal functions of stopping the vehicle or holding it against movement on hills or uneven roadways.

Still another object is to provide such an automatic transmission wherein changes of driving ratio are effected by power operating means without requiring the driver to exert physical effort, the action of the power operating means being regulated by a very simple and reliable control system requiring no accurate timing of clutch engagement and disengagement, the elimination of the necessity of such accurate timing rendering it literally impossible to lock the transmission in two ratios at once, even if, due to accident or breakage, the control elements should not function as intended.

Still another object of the invention is to provide improved clutch means of the friction type incorporated in a single unit with hydrodynamic clutching and torque converting means, the friction clutch means being actuatable by hydraulic pressure and novel means being provided to eliminate unwanted effects of centrifugal force upon the action of the friction clutch and its hydraulic actuating means. It is also an object to incorporate novel fluid operated means to release the friction clutch when desired, the releasing means incorporating no springs and being much simpler and more compact than presently known clutch releasing mechanisms.

A further object is to provide an improved transmission control system incorporating novel automatic pressure regulating valves arranged to control the action of a hydrodynamic torque converter and also to control coacting hydraulically operable clutching means, and which system includes novel means for varying the action of such valves under the influence of factors which include the speed of the vehicle, the torque demand upon the engine, the extent of accelerator depression, and the will of the driver as expressed through the agency of the supervisory controlling means above mentioned.

Another object related to that last stated is to provide means for modifying the action of such a control system during periods in which the idling speed of the engine of the vehicle is increased concurrently with choking of the engine, as in cold starting.

Another object of the invention is to provide such a transmission having a controlling system of the hydraulic type incorporating a plurality of valves including valve means responsive to variations of vehicle speed for exercising a controlling function upon the transmission components, valving means responsive to the will of the driver and to the extent of depression of the accelerator for controlling the action of the principal ratio changing means of the transmission, and additional pressure responsive valving means exercising a supervisory function upon the operation of both of the aforementioned valving means.

A further object of the invention is to provide such an automatic transmission having a plurality of gear ratios which may be changed rapidly and virtually without interruption of power flow, without the employment of synchronizers, despite which shifting occurs without clashing and more rapidly than is possible with conventional gear shifting arrangement in which synchronizers are used.

Still another object is to provide such a transmission having speed ratios at least equivalent to those of a four-speed gear transmission, allowing a high rear axle gear ratio with direct drive in high, and which further incorporates means whereby the torque converter is disabled in direct drive so that it does not generate heat while driving in high gear.

Still another object is to provide such a transmission utilizing clutches for changing speed ratios and which is so designed that the torque loads applied to the clutches never exceed the engine torque, as a result of which the dimensions and cost of construction of the clutches may be held to a minimum.

It is further an object of the present invention to provide such a transmission wherein the hydrodynamic torque converter functions during starting and slow speed driving both in forward and reverse.

Additional objects of this invention comprise the provision of such an automatic transmission which attains the foregoing and other objects and advantages (more of which will become apparent from the remainder of this disclosure), through the agency of mechanism which is relatively simple and inexpensive to manufacture and all parts of which are practical from a production standpoint, easy to machine, fabricate and assemble, and of rugged and reliable character.

In the drawings:

Fig. 4 is a schematic view of the control system and associated transmission components controlled thereby;

Figs. 7 and 8 are views similar to Fig. 3 showing somewhat modified constructions;

Fig. 9 is a fragmentary hydraulic diagram corresponding to a part of Fig. 4 but showing a modified construction;

Figs. 10, 11, 12 are fragmentary detail sectional elevational views on a larger scale showing valving features;

Fig. 13 is a view similar to Fig. 9 showing another modification;

Fig. 14 is a thin cross section taken substantially on the line 14—14 of Fig. 13;

Figure 1:
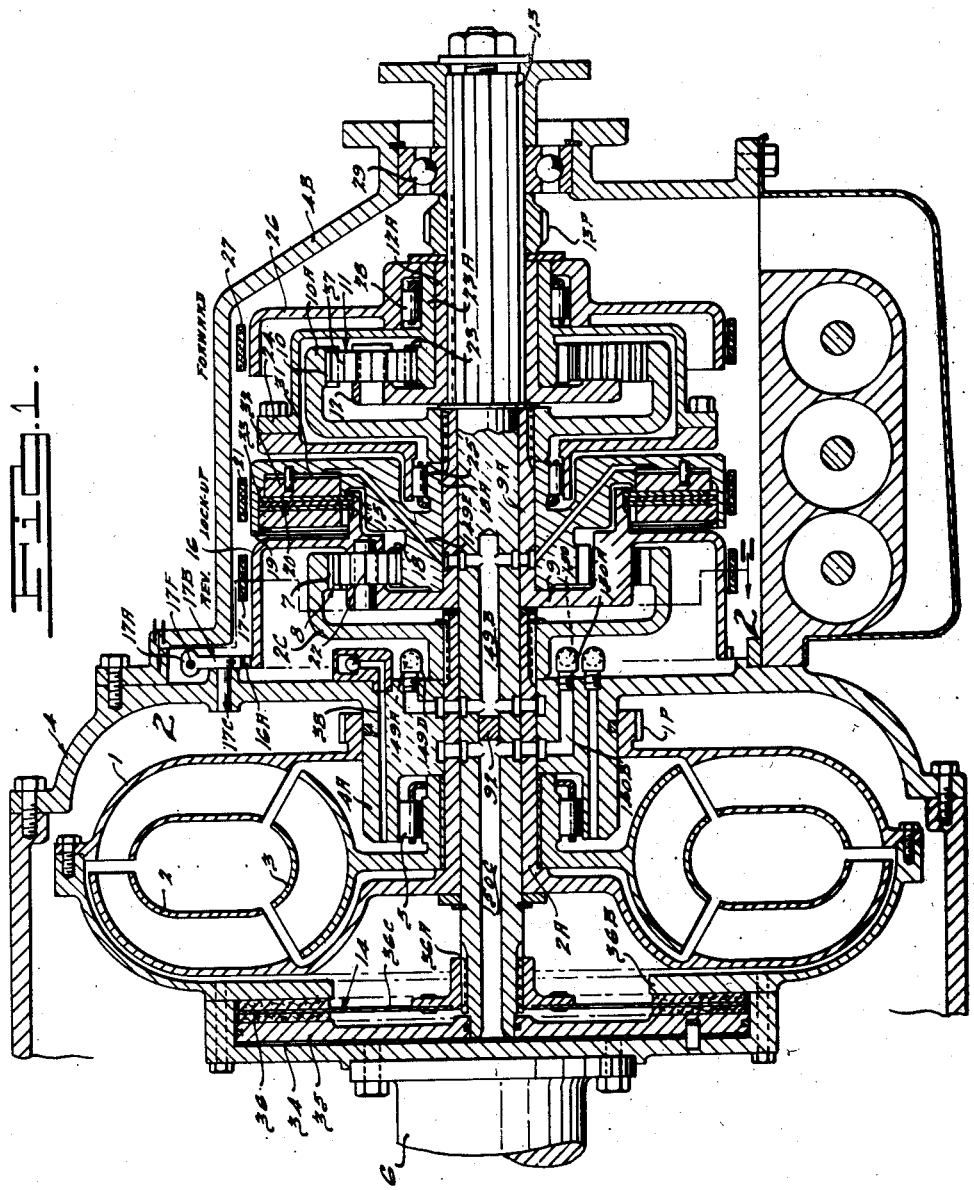
Fig. 1 is a substantially central longitudinal vertical sectional view of a transmission constructed in accordance with the present invention.

*Mechanical components of the transmission, general arrangement*

The transmission is indicated as housed in a casing, generally designated 4 and essentially conventional in character, its contour being such as to adapt it to be attached to and supported by the crankcase of an engine which is illustrated only fragmentarily, since its details form no part of my present invention. The crankshaft 6 of the engine is directly coupled to the pump portion 1 of the hydraulic torque converter, which is indicated as of conventional design. The hydraulic torque converter also includes a turbine member 2 and a reaction member 3. The reaction member 3 is freely rotatable in one direction, but is held against rotation in the opposite direction by an overrunning brake 5. The overrunning brake prevents the reaction unit from turning counter to the direction of rotation of the engine and the pump member 1, which direction is assumed to be clockwise as the assembly is viewed from the left, referring to Figure 1. During torque multiplication in the hydraulic torque converter, the reaction member will remain stationary, but as the one-to-one ratio is approached, the reaction member will rotate in the direction of the pump and the turbine, and the torque converter then functions as a fluid clutch and flywheel assembly.

The turbine 2 is connected by means of a sleeve 2A and a drum-type carrier 2C keyed to the sleeve with an internal toothed ring gear 7 of a front planetary gear set, generally designated 8, gear 7 being shown as integral with drum carrier 2C. This set also includes the pinions 22 supported by a carrier 9 which is directly connected to and turns as a unit with the internal toothed ring gear 10 of a rear planetary gear set generally designated 11. The planet carrier 12 of the rear gear set has an integral hub portion 12A keyed to the driven shaft 13.

Brake and clutch means are provided for selectively holding and releasing or locking together elements of the two planetary gear sets to provide forward and reverse drives. A clutch generally designated 14 is also provided to provide a positive two-way direct drive through the transmission.

The lowest speed drive is through the hydraulic torque converter and through both planetary gear sets in series, and this drive is maintained until the speed of reaction member 3 approaches that of the engine. A clutch is then operated to lock up the front planetary unit 8, establishing a one-to-one driving ratio through this unit. The entire reduction is then through the gear reduction of the rear planetary unit 11. As previously indicated, the direct drive is instituted by engaging clutch 14 to directly couple the driven shaft 13 to the crankshaft 6.

The front planet carrier 9 carries a set of friction clutch disks 15 which rotate therewith, and also carries as a part of the same rotatable unit a brake drum 16 and supplemental positive holding pawl means engageable with ratchet teeth 16A formed on the drum, whereby rotation of the carrier may be arrested. Clutch disk portions 33 coact with clutch disks 15, this clutch assembly being generally designated 20 and adapted to be applied by a pressure plate-piston member 32. A brake band 17, which is in effect anchored to the case 4, is arranged to grip the brake drum 16 to arrest rotation of the drum and the planet carrier 9. Clutch disk portions 33 rotate with the forward sun gear 18, these parts being connected by an integral drum assembly 19. It will be seen that when the clutch 20 is engaged, the entire front planet gear assembly turns as a unit, since the cage 9 is locked with respect to the sun gear. A brake band 21, which is in effect anchored to the case 4, is also engageable with the periphery of the drum 19 to hold the same against turning and thereby lock the sun gear 18 against rotation.

The front sun gear 18 has a one-way driving connection with the sun gear 23 of the rear planetary set, the hub 18A of the sun gear carrying an overrunning clutch assembly 25 which supports and serves to drive a drum assembly 24 rigidly carried by the hub portion 23A of the rear sun gear 23. Overrunning clutch 25 acts in such direction as to permit the front sun gear 18 to rotate faster than the rear sun gear 23 in the direction of engine rotation, but prevents relative rotation of these gears in the reverse sense with respect to one another. The hub 23A of the rear sun gear 23 also supports a drum 26 with respect to which it has a one-way driving connection through an overrunning clutch 28. A rear brake band 27 anchored to the case is engageable with the drum 26 to hold it against rotating. The overrunning clutch 28 acts in such direction that the rear sun gear 23 is thereby held against reverse rotation, but remains free to rotate forwardly in the direction of engine rotation.

*Operation of mechanical components*

It will be assumed that the transmission is driven by an engine which turns the crankshaft 6 and the pump 1 clockwise, considering the parts as if viewed from the left in Figure 1; and it will of course also be understood that shaft 13 is mechanically connected to the rear wheels of the vehicle as by conventional propeller shaft and rear axle means (not shown). If all of the friction clutches and brake bands are released, rotation of the pump 1 by the engine will rotate the turbine 2 and thereby the internal toothed gear 7 of the front planetary set. Both the front and rear sun gears 18 and 23 may turn freely and there is accordingly no reaction member for either sun gear. Under these conditions, the rear planet carrier 12 which is directly coupled to the propeller shaft remains stationary and the rear sun gear 23 and brake drum 26 are rotated in a reverse direction. The transmission is accordingly in neutral and no drive can be imparted to the rear wheels. If now the rear brake band 27 is applied to arrest rotation of the drum 26, both sun gears 23 and 18 will be stopped and held against rotation as the rear free wheeling unit 28 and the central free wheeling unit 25 are so constructed as to prevent a drive in the reverse direction, as previously indicated. The reaction from the forward sun gear is accordingly transmitted to the hub of the rear sun gear by way of overrunning clutch 25 and drum 24 and thence to band 27 and the casing by way of overrunning clutch 28 and drum 26, the reaction of the rear planetary set being transmitted directly to the anchored band 27 by way of overrunning clutch 28 and drum 26. At the lower driven shaft speeds, therefore, the drive is transmitted from the hydraulic torque converter by way of turbine 2 and internal ring gear 7 to the front planet carrier 9, which is turned forwardly at a reduced speed as the planet gears 22 are rolled upon sun gear 18. The drive from the planet carrier 9 is conveyed by way of sleeve 9A and drum 10A to the rear internal toothed ring gear 10 which rolls the planet gears 37 upon sun gear 23, thereby rotating the rear carrier 12 at a further reduced speed and a double reduction being imparted to the propeller shaft through the two gear sets, the carrier 12 being keyed to the shaft 13, as previously indicated.

As the speed of the turbine 2 approaches that of the pump 1 the torque reaction upon the reaction member 3 in the reverse direction falls away and the torque multiplying action of the hydrodynamic unit diminishes, the effective driving ratio being thereby increased until the two gear units furnish substantially all of the speed reduction and the reaction member 3 turns with the turbine elements 2. When this condition obtains, the transmission may be considered to have attained second speed, although this entails no change of gearing or of clutch or brake setting, and the variation from "first" to "second" entails a graduated ratio change as will be apparent.

If the clutch unit 20 is engaged by suitable means presently to be described in greater detail, as by oil pressure introduced into the compartment 31 behind the pressure plate piston 32, the disks 15, 33 are forced together and the front planetary gear unit is locked up as previously explained. Under normal driving conditions, the hydrodynamic unit continues to function as a fluid flywheel clutch and the front planetary unit being locked up, the only reduction is that afforded by the rear planetary gear unit. The speed ratio is thus again increased, giving a driving ratio which may be designated third speed. The front sun gear 18 now overruns the rear sun gear 23, this action being permitted by the overrunning clutch 25.

If after the speed of the vehicle has increased and the torque demand has fallen away sufficiently, the front clutch 14 is engaged by any suitable means, as by oil pressure forced into the compartment 34 behind piston pressure plate 35, clutch plate 36, which is keyed directly to the shaft 13 as indicated at 36A, is clamped against the reaction plate 36B which is fast with and shown as constituting a part of the rotary pump and casing assembly 1 which, as previously indicated, is directly coupled to the crankshaft 6 of the engine. A direct positive two-way drive at one-to-one ratio is thus established between the driving shaft and the propeller shaft and all of the transmission components of a rotary character may turn together with the exception of the drum 26 which may remain held by the band 27, although this is a matter of choice and it obviously could be released at this time if desired, depending upon the preferred arrangement of the control system (presently to be considered). If the unit is so constructed that the band 27 remains applied under these conditions, it will be seen that the hub 23A overruns the drum 26 at the overrunning clutch 28. Both the pump and turbine of the hydrodynamic unit are being driven at the same speed and hydraulic torque conversion is completely eliminated. The reaction member 3 will also rotate with the other members during direct drive, such rotation being permitted by the front free wheeling unit 5. There is thus no load upon the hydraulic torque converter and it does not generate heat during high gear driving.

If it is desired to use the engine as a brake, as in descending steep grades, both clutches 14, 20 are disengaged and the brake band 21 is applied to hold the drum 19, band 27 remaining engaged with drum 26. Both sun gears are thereby held against rotation since the front sun gear is directly connected to the drum 19, and the rear sun gear 23 is held against rotation by the overrunning clutch 25 as the rear sun gear will tend to rotate forwardly or clockwise as viewed from the left of Figure 1, thereby locking the overrunning clutch unit 25. The drive is then through both planetary gear sets, while under ordinary conditions the torque converter acts as a fluid flywheel and this lock-up speed is accordingly at the same ratio as the previously described second speed drive although it is a reversible or two-way drive providing for engine braking as indicated.

Reverse drive is accomplished without the addition of any extra sets of gears or clutches, utilizing the same planetary sets. Reverse drive is established from the neutral condition in which all clutches and bands are released as previously described, by engaging the forward brake band 17 with drum 16 to hold planet carrier 9 against rotation. Supplemental positive toothed holding means is also provided to reduce the loading of the reverse brake band, and this supplemental means will be considered in detail hereinafter. When the carrier 9 is held, front planet gears 22 will rotate upon their pins, turning the front sun gear 18 in a reverse direction. The front sun gear 18 will then drive the rear sun gear in a reverse direction through the overrunning clutch 25, which is locked against relative rotation of its elements when driven in a reverse direction as previously indicated. Rotation of the rear sun gear 23 in a reverse direction will roll the rear planet pinion 37 rearwardly at a reduced speed upon the stationary internal toothed ring gear 10, which is held against rotation by the engagement of brake band 17, since drum 16 and planet carrier 9 are directly coupled to the internal toothed gear by sleeve 9A and drum 10A as previously explained. The shaft 13 is accordingly carried around in a reverse direction at a reduced speed. The reduction effected by the rear planetary unit in reverse is greater than the reduction provided by this unit in the forward drives, because the smaller sun gear is used as the driving gear rather than the internal gear 10 which is utilized as the driver in the forward gear drives.

Considering typical ratios obtainable with such a transmission arrangement, by way of example, if the proportions of the front planetary unit are such that the transmitted torque is in the ratio of .6 in the reverse drive, the torque ratio of the rear planetary unit might be of the order of 3.5. An additional torque multiplication of the order of 1.64 may easily be secured from the hydraulic torque converter, so that this reverse drive provides a total torque multiplication of $1.64 \times 3.5$ equaling 3.44. This is only slightly less than the greatest torque conversion of the unit operating in low gear if the gears are proportioned approximately as indicated. The front planetary set when driving in a forward direction with the internal toothed gear constituting the driving member will give a reduction of 1.6 while the rear planetary unit driving forwardly gives a reduction of 1.4. With the hydraulic torque converter giving a reduction of the order of 1.64, therefore, the total in first gear would be approximately $1.64 \times 1.6 \times 1.4$ equaling a reduction of 3.67. When the torque converter reaches a driving ratio of substantial unity, the total reduction of course becomes $1.6 \times 1.4$, equaling a ratio of 2.24 for the so-called second gear, while with the rear planetary unit functioning alone, in the third speed drive the ratio is 1.4. These exemplary ratios are of course given only for the purpose of indicating the practical transmission designed in accordance with the invention by persons skilled in the art to fulfill the requirements of a typical passenger automobile, and are not intended in any sense as limiting the wide scope of applications to which may improved transmission is believed to be adapted.

It will be observed that the engine may be started by pushing or towing the car when utilizing either the lock-up second speed drive or direct drive.

When the transmission is in neutral, with all brake bands released, assuming that the vehicle is standing still or that the engine is turning faster than the equivalent coasting speed of the vehicle, the overrunning clutch 25 tends to lock up, because, due to the drag of the parts, the drive from the engine tends to rotate the front sun gear 18 rearwardly, and although it also tends to rotate the rear sun gear 23 rearwardly, the rear sun gear is turned at a lower speed. If the friction drag in the rear planetary set should be greater than in the front set, this merely gives further assurance that the overrunning clutch 25 will lock up. The front planet gears thus cannot be spun at excessive speed, even if the engine should be speeded up, and the danger of undue wear of the planet gear bearings is avoided.

It should also be noted that when the vehicle is allowed to coast in intermediate ratio, the rear wheels drive the turbine element 2 of the torque converter at 1 to 1 ratio. This is due to the fact that a reverse torque is applied to the freewheeling clutch 25, which locks it up at such time, and since clutch 20 is also locked up, both planetary gearsets are locked up and the drive is transmitted from the rear wheels through both the ring gear and sun gear of the rear unit to the carrier and sun gear of the front unit. This feature prevents the unduly severe deceleration which occurs with many designs if the accelerator pedal is released when the car is traveling in the intermediate speed. It also prevents undue churning of the oil and loss of efficiency in the operation of the torque converter at such time, and further prevents a so-called "bump" upon a downshift.

*Control system: Fluid pressure supplying and regulating means*

My improved transmission also includes certain fluid pumping and valving means which are depicted more or less diagrammatically, since the mechanical details of their construction may be varied widely, as will be appreciated, and such details do not in themselves constitute important inventive features.

Referring to Fig. 4, a front fluid supply pump 41 is provided, drivable by the engine of the vehicle as through the agency of gear 1P (Fig. 1) carried and drivable by pump element 1. A rear fluid pump 42 is also provided, drivable by the driven shaft 13 of the transmission as through the agency of the gear 13P, and accordingly operable whenever the wheels of the vehicle are turned. Both pumps are indicated as of the positive displacement gear type, and both, when in operation, draw fluid, preferably oil, from a reservoir or sump 39 through suitable conduit means 40 and supply it to the fluid delivery conduit 43, in which pressure is always available, whenever the engine is turning or the car is in motion. The maximum pressure is limited by a safety return valve 44. A ball check valve 45 is also incorporated in the output of pump 42, to prevent this pump from drawing fluid from the supply line 43 when the motion of the vehicle is reversed. Conduit 43 is connected to the inlet port 46A of a pressure control valve 47 and is also connected to the inlet port 46B of a pressure control valve 48. Pressure control valve 47 controls the fluid pressure in the torque converter, while pressure control valve 48 controls the pressure of the fluid employed to actuate the friction clutches and brake bands incorporated in the transmission. The expression, "pressure control valve" will be abbreviated as "PC valve" hereinafter. These valves are of the spool type, as shown, and have corresponding circumferential grooves respectively designated 49 and 50 disposed substantially centrally thereof. Each valve is also provided with a drain outlet as 51 and 52. The drain outlets are connected to the sump by a return conduit which is fragmentarily indicated at 53. The controlled pressure output passage 54 from the valve 47 opens into the interior of the torque converter housing 1. A branch passage 56 connected to the passage 54 leads to a chamber 57 under the stem of the valve 47, the stem portion contained within the cylindrical chamber 57 being somewhat reduced in diameter and constituting a piston portion designated 58. A spring 66 bearing against the opposite end of the valve urges it in a direction opposite to that in which it is urged by pressure in the chamber 57. An additional controlling force is exerted longitudinally upon the valve in the same direction as it is urged by pressure in chamber 57, the additional effort being exerted against the shouldered land 60 which is formed by the surface joining the reduced piston head 58 with the lower spool of the valve. A chamber 59 beneath the shouldered surface 60 is connected by a passage 55 to the casing 61A of a valve 61 which when in the position shown in Fig. 4 allows the chamber 59 to be drained through a drain passage 62 connected to the sump. Passage 55 contains a restricted orifice 87. Valve 61 is urged to the right (as viewed in Fig. 4) by a helical compression spring 64. When the valve is moved to the left against the resistance of this spring, by means presently to be described, the drain passage 62 is cut off and the chamber 59 is connected to the fluid supply conduit 43 by means of branch conduit 63.

Spring 66 is of such proportions as to impart to the valve 47 such characteristics that it may normally tend to maintain a suitable pressure in the controlled pressure conduit 54 and thus in the hydraulic converter housing 1. Such pressure may, for example, be of the order of 45 lbs. per square inch.

The operation of the pressure control valve 47 is as follows: When there is no pressure in the supply passage 43, valve 47 is held down by spring 66 and the connection afforded by chamber 49 between supply port 46A and control pressure passage 54 is accordingly wide open. The full pump pressure is thus at first admitted to the passage 54 upon starting, but as the pressure builds up to above the desired value, the corresponding increase of pressure in the chamber 57 lifts the valve 47, throttling the port 46A and simultaneously partially opening the escape port 51. Conversely, when the pressure in the controlled pressure passage 54 drops below the desired value, the corresponding fall of pressure in compartment 57 permits the valve to move down, thereby tending to close off the drain and to open the inlet port 46A. These parts are so balanced as to tend to maintain a constant pressure in the torque converter casing 1. If the valve 61 is moved to the left, however, pump pressure is also introduced into the chamber 59 to augment the closing effort exerted upon the valve by the pressure in chamber 57. The parts are so proportioned that the additional closing effort thus exerted upon the valve 47 throttles the main inlet port 46A to such extent that the controlled pressure in the hydraulic torque converted is thereby reduced to a lower predetermined value, for example, 10 lbs. per square inch. It is thus possible to obtain a value of the order of 45 lbs. per square inch, as previously indicated, with the valve 61 in the right-hand position shown in Fig. 4, and to reduce the pressure in the hydraulic torque converter to a constant lower value of the order of 10 lbs. per square inch when valve 61 is moved to the left-hand position.

The parts are preferably so arranged that any leakage from the torque converter drains back to the sump. Since some leakage may be unavoidable when the car remains at rest for a long period, it is desirable to insure refilling of the torque converter as rapidly as possible upon starting of the engine. A passage 38 is therefore provided extending through the stationary hub portion 4A of the torque converter to connect the interior of the torque converter casing 1 with the atmosphere, preferably within the transmission gear casing portion 4B, as best shown in Fig. 1. The outer extremity of vent passage 38 terminates in a valve casing 67 within which a valve ball 68 is loosely arranged. The valve ball normally rests upon and tends to close off a lower seat defined by the outer end of passage 38. When oil enters the casing 1 through the passage 54 upon starting, the valve 68 is lifted from this lower seat by escaping air permitting the air to escape as the filling of the casing with fluid continues. When the casing is filled with liquid to the level of the passage 38 and the liquid attempts to escape past the valve 68, the ball is lifted higher, due to the greater viscosity of the liquid, and is forced against an inverted seat 69 to seal the escape orifice 38A and thereby the passage 38, which is maintained closed by the ball so long as liquid under pressure is being delivered to the casing through the conduit 54.

PC valve 48 is constructed and functions generally like PC valve 47, with certain differences which will hereinafter be more fully set forth. The controlled pressure output passage 70 from PC valve 48 is connected by means of a branch passage 71 with a chamber 72 under the valve. Thte pressure thus introduced into chamber 72 tends to lift the valve 48 and to throttle its inlet port 46B. The reduced lower extremity or plunger portion 73 of valve 48 is hollow and forms a partial housing for a spring 82 which augments the throttling effect of the pressure in chamber 72. The throttling forces are opposed by a helical compression spring 75 which urges the valve downwardly, acting through the agency of a stem 74. The spring 75 acts downwardly against a suitable abutment 75' attached to the stem, and reacts upwardly against a collar 76 which positions but is slidable upon the upper extremity of the rod.

The preloading of the spring 75 is adjustable by varying the position of the collar 76 through the agency of a bellcrank 77 fulcrumed upon a fixed axis indicated at 77A and pivotally connected to the collar 76 as indicated at 76A. The position of the bellcrank 77 is influenced by that of the accelerator pedal or other throttle operating means for the engine and the spring 75 is so proportioned that when the accelerator pedal is fully released or in the up position, the pressure in the control pressure passage 70 is at a minimum, but such pressure is progressively increased as the accelerator is depressed in opening the throttle.

The maximum pressure which can be developed in the passage 70 is limited by an adjustable abutment screw 80A which limits clockwise rotation of the bellcrank 77, as the latter is viewed in Figure 4. Clockwise rotation will be seen to increase the preloading of the spring 75 and the resulant pressure in the controlled pressure output passage 70. Over-travel of the accelerator beyond the full pressure position of the valve is permitted by a yieldable connection afforded by a spring 81 interposed between the throttle operated rod 80 and the bellcrank 77. These parts are connected by means of a link 78 which is provided at one end with a head 78A which overlies one side of the bellcrank arm 77, through which arm the link 78 projects in a freely slidable manner. The outer extremity of the link 78 is also headed, as indicated at 78D, and the helical compression spring 81 is interposed between the head 78B and a collar 79C, through which collar the link 78 is also freely slidable. Collar 79C is carried for pivotal movement about an axis transverse to that of link 78, by a bellcrank arm 79 pivoted upon a fixed axis provided by a pin designated 79A. The rod 80, actuated by the accelerator, is pivotally connected to the lower extremity of the bellcrank arm 79. It will accordingly be apparent that movement of the rod 80 to the left, which is considered to be the direction of movement resulting from opening of the throttle, exerts force upon the bellcrank 77 tending to rock it clockwise and accordingly to reduce the throttling effect of the valve 48 and increase the regulated output pressure in the manner previously described. It will also be noticed that closing movement of the throttle has no effect upon the position of the bellcrank 77 except that represented by relaxing of the springs 81, 75, since the stem 78 is freely slidable through the collar 79C and through the opening in the lower extremity of bellcrank arm 77.

The spring 82 represents additional means for varying the controlled pressure output of PC valve 48, since the preloading of spring 82 is also subject to variation, preferably to compensate for differences in operation which normally result from choking of the engine during starting periods before the engine is warmed up. The choking means associated with the carburetors of gasoline engines of the types commonly used in present-day motorcars are ordinarily equipped with supplemental means to increase the idling speed of the engine while the carburetor is subjected to the choking effect. It will be appreciated that when the idling speed of the engine is thus increased, the pressure for engagement of the friction clutches and bands of the transmission, especially those used in starting the car, should be altered to compensate therefor if smooth operation is to be obtained under such conditions. The means (not shown) for choking the carburetor is accordingly connected by means of a flexible actuating wire 84 to a slidable abutment member 83 against which the lower extremity of spring 82 reacts. When the engine is choked, the wire 84 and the abutment 83 are moved upwardly, as these parts are viewed in Fig. 4, to increase the loading of spring 82. This will be seen to tend to close the inlet port 46B of the valve 48 and to reduce the pressure in the output line 70 for any given accelerator depression. In order to obtain sufficient pressure in line 70 to actuate the friction clutches and bands, therefore, wider throttle opening is required during such high idle periods in which the choke is actuated than is required under normal conditions when with the choke released the abutment 83 returns to the lowered position in which it is shown in Fig. 4.

Leakage past the valve 48 accummulates in an annular chamber 85 surrounding the piston portion 73 at the lower extremity of the valve. Chamber 85 is connected to the sump by a return conduit (not shown), which communicates with the chamber through a restricted bleed orifice 86. By reason of the restricted size of the orifice 86, compartment 85 serves as a dashpot to cushion the movement and prevent oscillation of valve 48. The restricted orifice 87 in the passage 55 leading to the corresponding chamber 59 at the lower extremity of PC valve 47 similarly dampens the movement of valve 47.

*Control system: Supervisory selecting means*

The controlled output pressure of the valve 48 is conducted through passage 70 to the body 89 of a selector valve 88. The selector valve may be movable by a hand-lever 90 which may be located in the driver's compartment in a position convenient to the driver, as upon the steering column. The valve 88 and hand lever 90 are directly connected for corresponding movement, as by linkage means generally designated 91, and the lever arm and valve are adapted to be placed selectively in any one of four positions, viz; the reverse position designated "R" and in which the parts are shown in Fig. 4 or in the neutral position, the forward position, or the lock-up position, the last three mentioned positions of the lever being denoted in dot-dash lines in Fig. 4 and respectively designated "N," "F" and "LU." With the parts in the positioning shown in full lines, the fluid flows to the selector valve casing 89 through the passage 70 and enters the valve casing through an annular groove 93. Five other similar annular grooves are spacedly formed along the interior of the valve casing and are designated 94, 97, 100, 103 and 105. Groove 94 communicates with the passage 95 which serves to conduct the fluid to a piston-type servomotor 96 which when actuated forces the reverse brake band 17 against the drum 16. Groove 97 communicates through the passage 98 with a piston-type servomotor 99 arranged to similarly actuate the forward drive brake band 27 to clamp the same against and arrest rotation of the drum 26. Groove 100 communicates with the passage 101 through which fluid may be conducted to a similar servomotor assembly 102 which when energized actuates lock-up brake band 21 to clamp the same against and arrest rotation of drum 19 to establish the lock-up or two-way second speed drive as previously described. Groove 103 communicates with a drain outlet 104 through which fluid may escape to the sump from the valve casing. Groove 105 communicates with a passage 106 through which fluid may be conducted to the body 107 of a speed responsive valve 124 presently to be described.

The selector valve 88 is also of the spool type, having three annular chambers designated 108a, 108b and 108c, and four lands or spool portions designated 109A, 109B, 109C and 109D.

With the selector valve in the reverse position shown in Fig. 4, the passage 106 is open to drain since the fluid may pass from the annular groove 105 through the valve body and out the open end 110 which may drain into the sump.

When the selector valve is moved to the left far enough to carry the spool portion 109A to the left of groove 94, the passage 95 may similarly drain from the then open right end of the valve casing, which may also discharge into the sump.

The valve 88 is also provided with a longitudinal bore 112 which is closed at both ends and with openings 113, 114, providing communication between such bore and valve chambers 108A, 108C respectively.

The left end of the bore 112 may be plugged by means of a combined plug and coupling member 112P which provides mechanical connection between the valve and the linkage means 91. The piston 96A of the motor 96 is indicated as acting upon the brake band through the agency of a lever 115 which is connected to one end of the band by a link 115A, the reaction of the opposite extremity of the band being transmitted to the casing portion 4B of the transmission through a link 118. Link 118 also serves to actuate supplemental reaction point means which will presently be described. A compression spring 119 trapped between and reacting outwardly against the ends of the band releases the band and frees the drum 16 when the pressure within the motor assembly is released.

The selector valve is also mechanically coupled to the bell crank 77 in such manner as to influence PC valve 48 when the valve 88 is in lock-up position. A rod 120 pivoted to lever 90 is slidably fitted into a socketed element 121 pivotally attached to the bell crank arm 77. The interfitted rod and socket portions 120, 121 are of such length that they have no effect upon the positioning or movement of the bell crank 77 when the valve is in the reverse neutral or forward positions. Movement of the valve to the lock-up position, however, causes the outer extremity of rod 120 to bottom in the socket 121 and to move the bell crank lever 77 clockwise through a predetermined angle. This will be seen to decrease to a predetermined extent the throttling action of PC valve 48 and prevent the controlled pressure in passage 70 from dropping below the desired minimum value. This value is sufficient to insure adequate pressure within the servomotors 99, 102 so that the force applied to their bands by these motors will be adequate to insure effective holding of the drums 19, 26 against slippage when the engine is being turned by the rear wheels under coast conditions in the lock-up drive. It will be noted that this arrangement does not tend to open the throttle, by virtue of the lost motion connection between the link 78 and bell crank 77.

*Control system: Operation of selector valve*

With the valve 88 in the position shown, which position it occupies when the lever 90 is in position R, as illustrated, pressure is delivered to valve chamber 108A by conduit 70 and groove 93. The fluid under pressure is accordingly delivered to servomotor 96 by way of chamber 108A and conduit 95, and band 17 is accordingly forced against drum 16 to put the transmission in reverse in the manner previously described. The fluid-operated actuating means for all of the other clutches and brake bands are connected to drain at this time to insure their remaining in the released condition. Conduits 98 and 101 which lead to the servomotor 99, 102 respectively, for the forward and lock-up drives, are connected to drain orifice 104 by way of grooves 97, 100, and valve chamber 108B. Conduit 106 through which fluid is supplied for actuation of the clutches 14 and 20 is connected to drain opening 110 by way of groove 105 and the open left end of the valve casing 89.

When the lever 90 is moved to the neutral or N position, the valve 88 is moved to the left until the right-hand spool or land 109A lies just to the left of the internal groove 94 in the valve casing. Conduit 95 is thereby connected to drain through the then-open right end of the valve casing 89 while the other passages 98, 101, 106 also remain connected to drain in the manner previously described since the valve has not been moved far enough to carry any of the other lands 109B, 109C or 109D across any of the internal grooves in the valve casing. All of the friction brakes and clutches are accordingly released, and the transmission is in neutral as described in connection with the operation of the mechanical transmission components.

Upon movement of the lever 90 farther to the left to the forward position, the valve 88 is carried to the left until the spool 109A lies approximately midway between the grooves 93 and 94, the spool 109B is between the grooves 97 and 100, and valve chamber 108C registers with groove 105. The output pressure from PC valve 48 is now delivered to passage 98 and servomotor 99 by way of valve chamber 108A, and band 27 is applied to lock drum 26 to establish the low-speed drive in the manner previously described. Pressure is also supplied to the conduit 106 through opening 113, bore 112, and opening 114 which communicates with valve chamber 108C and thereby with groove 105 to which conduit 106 is connected. Passage 95 is open to drain through the right end of valve casing 89, while conduit 101 is still connected to the drain opening 104 by way of valve chamber 108B. Under the usual conditions, assuming the vehicle to be accelerating, the torque converting function of the hydraulic torque converter falls away as the speed increases, while both planetary gear trains remain in the line of drive and function in the manner previously described. During acceleration in low gear, the fluid supplied to conduit 106 has no effect upon the clutches 14, 20, but these clutches are rendered operative to establish the higher speed drives by speed-responsive actuating means for the valve 122 presently to be described.

Upon movement of the lever 90 to the LU, or lock-up position, the valve 88 is carried further to the left. At this time spool 109A lies just to the right of groove 93, spool 109B lies between grooves 100, 103, and spool 109C is just to the left of groove 105. The control pressure from the passage 70 is now delivered through both of the passages 98 and 101 by way of valve chamber 108A providing the lock-up second speed two-way drive in the manner previously described. The reverse brake band 17 will remain released, since passage 95 remains vented through the right end of the valve casing, while conduit 106 is also connected to drain through valve chamber 108B and passage 104. Release of pressure from passage 106 disables the third speed and direct-drive clutches 20, 14, respectively, and the transmission accordingly remains in the two-way second speed lockup drive. At this time the position of the bell crank 77 is also shifted by engagement between the stem 120 and the bottom of socket 121, in the manner previously described, to increase the minimum output pressure of PC valve 48 to a value sufficient to insure full holding engagement of brake bands 27 and 21.

*Control system: Speed-responsive means*

The speed-responsive control valve 122 is also of the spool type and is movable by governor means generally designated 130, drivable by any suitable means including the gear 138 from the transmission output shaft. The action of the governor accordingly bears a fixed relation to the speed of the vehicle. The governor is indicated as of a conventional variety including flyweights 131 acting through toggles 132—133 upon the longitudinal position of a collar 128 which is coupled as by a yoke 126 to one extremity of the valve 122, the valve being thereby movable longitudinally in response to speed variations of the vehicle. Outward movement of the flyweights, and leftward movement of the collar 128 as the parts are viewed in Fig. 4, are opposed by a helical compression spring 136 encircling and carried upon the governor shaft 134. The collar is keyed to turn with the shaft by means of a keyway 135 which permits free longitudinal sliding movement of the collar. A similar collar 129 at the opposite end of the governor assembly is similarly keyed to the shaft in such manner that it always rotates therewith but is slidable therealong. Leftward movement of collar 128 is limited by a pin 135A which is located in but does not project above keyway 135. The governor shaft is supported near its ends by suitable bearings as 139—140. The yoke 126 is fitted into a groove 127 in the collar 128, permitting free rotation of the collar with respect to the yoke, and the yoke is attached to the projecting end of the valve by means of a screw 125 which also serves as a plug for an axial bore 123 which extends longitudinally through the valve.

The position of the collar 129 is adjustable longitudinally along the governor shaft to vary the action of the governor, in response to the position of the accelerator pedal. An antifriction bearing 141 is fastened upon the collar 129 as by means of the snap ring 142, and one arm as 145A of a bell crank 145 is formed as a yoke adapted to actuate the bearing assembly longitudinally and thereby to adjust the positioning of the yoke 129 when the bell crank is rocked. Bell crank assembly 145 is so connected to the bell crank 79 that clockwise rotation of bell crank 79 beyond a predetermined position imparts similar rotative movement to bell crank 145, although counterclockwise rotation of bell crank 79 has no influence upon the position of bell crank 145. This connection between the bell cranks 79, 145 is provided by a stem 144 pivoted to the lower arm 145B of bell crank 145 and slidably projecting into a socketed member 143 similarly pivoted to the upper arm 79B of bell crank 79. Clockwise movement of bell crank 145 is limited by an abutment 147 and a tension spring 148 tends to return bell crank 145 counterclockwise to the position in which collar 129 lies at the left extremity of its movement. Opening movement of the accelerator moves rod 80 to the left, rocking both bell cranks 79, 145 clockwise and moving collar 129 to the right. This ends to load the spring 136 and to move the entire flyweight and collar assembly of the governor to the right as viewed in Fig. 4, opposing the tendency of the governor to move the valve 122 to the left toward the high-speed position and accordingly resulting in delaying the upshift at wider throttle openings until the car has attained a higher speed. It will be seen that this may also function to cause a down shift in response to wider opening of the throttle when the vehicle is traveling below a predetermined speed. It will also be appreciated that the one-way connection furnished by the telescoping parts 143, 144 prevents the governor from influencing the throttle setting.

Speed-responsive valve 122 is formed with three peripheral channels defining chambers 122A, 122B, and 122C, while the valve body is provided with four internal annular grooves designated 107A, 107B, 107C, and 107D. Groove 107A communicates with conduit 106, and it will be appreciated from the foregoing description of the operation of the selector valve that when the selector valve is in the F or forward position fluid under pressure from the output of PC valve 48 is also furnished to the interior of valve casing 107 through groove 107A. Groove 107B is connected by conduit means 149A, 149B to the actuating chamber 31 for the friction clutch 20. Communication between conduit 149B and the cylinder 31 is provided by channels best shown in Fig. 1, including a longitudinal bore portion 149B formed in shaft 13 and connected by suitable radial passages and grooves, extending through sleeve 2A and shaft 13 with a coupling portion 149D carried by the hub portion 4A and to which conduit 149A is coupled, the other extremity of bore 149B being connected by a passage 149E formed in the hub of drum 19 to the cylinder 31. Internal groove 107C (Fig. 4) is connected by means of a conduit 150 to a system of passages leading to the actuating cylinder 34 of clutch 14. The system of passages for effecting connection between the conduit 150 and cylinder 34 is also clearly shown in Fig. 1 and includes a coupling member 150A carried by hub 4A and to which conduit 150 is connected, a feed passage 150B extending to the hub through a suitable system of radial passages and peripheral grooves extending through the sleeve 2A and the shaft 13 to provide constant communication with axial bore portion 150C formed in the shaft, as an extension of bore portion 149B but isolated from bore portion 149B by a plug 92, and extending forwardly to open at its forwardly extremity within the actuating cylinder 34. Annular groove 107D (Fig. 4) is provided with a return drain connection to the sump 39 by way of opening 151.

When the car is at rest and the accelerator pedal released, the governor valve 122 is in the position shown and the actuating cylinders 31 and 34 for the clutches 20 and 14 are both open to drain through valve chamber 122C and drain opening 151. If the governor moves the governor valve so that the spool portion 152 is to the left of internal groove 107B, communication is established between conduit 106 and conduit 149A so that if the selector valve is in the forward position, pressure may be supplied to cylinder 31 to actuate the clutch 20 to establish the third-speed drive in the manner previously described. If the speed of the car increases further and the governor resultantly moves the governor valve farther to the left so that the spool portion 152 passes to the left of groove 107C, the controlled fluid pressure is thereby permitted to pass through conduit 150 and the passage means previously described to the actuating cylinder 34 for the direct drive clutch 14. Direct drive then becomes effective in the manner previously described. When either of the clutch cylinders 31 or 34 is connected with the supply passage 106 in the manner described, such clutch is cut off from the drain or outlet passage 151 by the land 152.

In order to prevent the transmission from shifting down to a lower speed until the car speed has fallen below that at which the last preceding upshift occurred, a single ball-detent arrangement is provided tending to delay the down shift. The detent means is indicated as comprising a pair of conventional spring-pressed balls 153 urged against the surface of the governor valve, which is provided with an appropriately positioned detent groove 156 having sloping side walls. A spool portion 155 of the full diameter of the valve separates the groove 156 from the valve chamber 122C and is joined to the reduced portion of the valve which defines the peripheral chamber 122C by an inclined wall designated 157.

If the governor valve is moved toward the left in response to increasing car speed, as previously explained, the detent balls 153 move into the groove 156 as the valve reaches the position in which valve chamber 122B provides communication between fluid supply conduit 106 and the passage 149A leading to the actuating means for the clutch 20. The valve is thus yieldably held in this position by the detent balls. As previously explained, such position of the speed-responsive valve is that corresponding to establishment of the third-speed drive. Since the left end of the valve upon which the balls ride before encountering the groove 156 is a straight cylindrical surface, the detents do not affect the speed at which actuation of the third speed clutch is effected, but the sloping sides of the groove do oppose further movement of the valve after it has attained the third-speed position, so that greater effort on the part of the governor system is required to move the valve either back to the right hand position shown in Fig. 4 (which in normal operation would re-establish the second-speed drive), or to move the valve further to the left to the above-described position which establishes direct drive. In moving from the third-speed position to the fourth-speed position, the detent balls are required to ride over the land 155. They then pass down the sloping surface 157 as the valve moves to the position in which valve chamber 122B established communication between supply passage 106 and conduit 150 leading to the direct-drive clutch. It will be appreciated that the engagement between the detent balls and the frusto-conic surface 157 tends to oppose subsequent return movement of the valve 122 from the fourth-speed position to the third-speed position and that this is desirable both to prevent hunting of the valve and to enable the car to be slowed down in high gear under light loads without downshifting of the transmission. It will also be appreciated that if rapid acceleration is required while the car is moving slowly in fourth gear and with the detent means preventing down-shift movement of the valve 122, opening of the throttle by depression of the accelerator pedal will tend to move the governor assembly to the right in the manner previously explained and that this will induce a down-shift by imposing additional force upon the valve sufficient to overcome the detent means and move the valve to the right to the third-speed position.

In order to eliminate any tendency of the valve to develop a snap motion which might carry the detent groove 156 entirely past the balls under the inertial momentum it acquires because of the delaying action of the detent balls, a dash-pot effect is provided to control the rate of valve movement. The dash-pot system is shown as comprising a fluid well 159 connected by a restricted orifice 161 to a chamber 160 which encloses the right end of the valve 122. The valve thus acts as a piston which, if moved to the left, will draw fluid from the well through the bleed orifice 161 into the compartment 160, while if moved to the right, the valve will force fluid from compartment 160 through the bleed orifice and into the well 159, the rate of movement of the valve being thereby governed by the metering effect of the orifice 161 in the well-known manner. The damping action of the dash-pot assembly is sufficient to prevent overtravel of the valve, eliminating any tendency of the valve to snap the groove 156 past the balls.

*Control system: Anti-creep means and automatic clutch pressure control*

The invention also incorporates means for increasing the output fluid pressure from PC valve 48 as additional clutches are engaged in response to leftward or up-shift movement of the speed-responsive valve 122. This additional means is also arranged to control the rate of such pressure increase in a manner to insure smooth engagement of the third speed and direct drive clutches. This additional controlling means performs the further function of preventing free wheeling in direct drive by insuring sufficient fluid pressure to keep the forward drive brake band 27, as well as the clutches 20 and 14, engaged when the throttle is closed in response to release of the accelerator. It will be seen that without such supplemental controlling means the pressure would fall away under such accelerator release because of the relaxing of spring 75. This supplemental control means also makes it possible to so arrange the entire control system that when the vehicle is at rest and the accelerator pedal released, the forward-drive clutch is disengaged, automatically placing the transmission in neutral and eliminating any transmission of torque to the rear wheels resulting from the drag of the hydraulic torque converter. Such tendency in many transmission constructions causes the car to creep or move slowly forward when the driver wishes to hold the car stationary with the transmission adjusted for forward drive, as for example while the car is stopped in traffic.

The supplemental controlling means comprises a valve casing portion designated 166 shown as formed integrally with the common casing means for the PC valves 47 and 48 and for the supplemental regulating valve 61. Casing portion 166 contains a cylindrical chamber 162 extending parallel to and beside the PC valve 48 and containing a pair of opposed oppositely and outwardly facing hollow pistons 163, 164, urged outwardly away from one another by an interposed helical compression spring 165. Piston 163 constitutes a supplemental pressure regulating valve while the upper end of chamber 162 is open, exposing the head of piston 164, which functions as a tappet to actuate a rocker arm 167 pivoted on top of the valve casing as indicated at 167A. An integral arm 167B extends over and is adapted to bear downwardly against the top of PC valve 48. The fluid supply passage 43 from the pumps 41, 42 is connected to the lower extremity of cylinder 162 via a branch conduit 169 which contains a restricted orifice 170. Between the restricted orifice and the chamber 162 a branch conduit 172 is connected to the conduit 169 and leads to a port 173 formed in the side of speed responsive valve casing 107. Pressure admitted to the bottom of chamber 162 is adapted under certain conditions to force the piston valve 163 upwardly and so successively to expose ports 176, 180 formed in the side of casing 166.

When the speed responsive valve 122 is in the position shown in Fig. 4, piston valve 163 is not urged upwardly because the fluid under pressure passing through the metering orifice 170 may escape through conduit 172 and port 173 and through valve groove 122A of the speed responsive valve into the internal bore 123 of the last mentioned valve, which bore it enters through a radial opening 174 which provides communication between valve groove 122A and the internal bore. The fluid then passes from the internal bore 123 through a radial opening 175 into valve chamber 122C, whence it may return to the sump through escape port 151. The pressure supplied through orifice 170 accordingly has no effect upon the position of the piston valve 163 when the speed responsive valve is in the position shown, in which the actuating means for the third speed and direct drive clutches are disabled.

When the speed responsive valve is moved to the left, to the third speed position previously described, groove 122A becomes disaligned with port 173 and the latter is sealed off by the smooth right-hand extremity of the speed responsive valve. The pressure accordingly builds up under the piston valve 163 forcing the latter upwardly, increasing the loading of spring 165 and applying a supplemental downward force upon PC valve 48 through the agency of rocker arm 167. The pressure supplied via conduit 70 from PC valve 48 is accordingly increased when third speed clutch 20 is brought into operation by the speed responsive valve. During third speed operation, the piston valve 163 remains in a position such that its head lies above the port 176 but below the port 180. The overflow of pressure fluid then passes through the port 176 and a connected passage 177 into the left end of the casing portion 61A for the valve 61. From this valve casing portion it escapes through the open left end 179, whence it may return to the sump.

The passage 177 discharges into the side of the casing 61A through a port 178 which is so located as to be closed off when the valve 61 moves to the left. The right end of the valve chamber 61A is connected to the conduit 150 by a branch conduit 65. Thus, whenever pressure is supplied to the conduit 150 to actuate the direct drive clutch 14 the valve 61 is forced to the left. Such leftward movement of valve 61, by closing off the passage 177, causes the pressure to build up further under the piston 163, and such piston is then moved up until it uncovers the port 180, additionally loading the spring 165 and reacting downwardly upon PC valve 48 with increasing force and resultantly increasing the clutch actuating pressure delivered from the last mentioned valve to the supply conduit 70. The overflow from the port 180 returns to the sump, while the pressure delivered to the right end of valve 61 through passage 65 moves the valve 61 to the left in the manner previously described, closes the escape port 62 and connects the chamber 59 beneath PC valve 47 to the pump supply line 43 by way of branch conduit 63, as also previously described. The pressure delivered to the hydraulic torque converter casing 1 by way of conduit 54 is thus substantially reduced whenever clutch 14 is actuated by delivery of fluid pressure to cylinder 34 by way of conduit 150.

Since the pressure delivered to the torque converter casing tends to oppose the pressure delivered to clutch actuating cylinder 34, it will be understood that less pressure is required to actuate the clutch 14, by virtue of this arrangement, than would otherwise be required. When delivery of fluid under pressure to conduit 150 is cut off, to release the clutch 14, the resulting release of pressure at the right end of valve 61 permits the last mentioned valve to again move to the right under the influence of spring 64 and the output pressure of PC valve 47 again rises, to increase the pressure within the hydraulic torque converter casing. The pressure developed within this casing reacts against piston 35 and insures complete release of clutch 14 although, as will be apparent, no release springs or other special releasing mechanism is required. Openings as 36C are formed in clutch plate 36 to insure free access of fluid pressure to the right side of piston plate 35 while maintaining a balanced pressure upon both sides of the clutch plate 36.

Referring again to the supplemental pressure control valve assembly, it will be noted that a breather opener 168 is formed in the piston 164 to relieve any pressure which may exist due to leakage past the lower piston 163.

*Control system: General operative and design considerations*

Although it is believed that the operation of the control system will be understood from the foregoing by those skilled in the art, some general discussion of various aspects of its design, operation and performance may be helpful. When the engine is running or the car moving, fluid under a predetermined pressure, which is limited by the pressure limiting valve 44, is delivered to conduit 43, and this pressure is supplied to both of the PC valves 47 and 48. The controlled pressure from PC valve 47 keeps the hydraulic torque converter casing filled and controls the pressure therein. The maintenance of a relatively high pressure, for example of the order of 45 lbs. per square inch, under normal operating conditions, within the casing 1 is conducive to more efficient operation of the torque converter, with many torque converter designs, but even if a lower pressure is utilized within the hydraulic torque converter, the pressure delivered to its casing will be ample to positively disengage the clutch 14 by its reaction against the large diameter pressure plate piston 35. It will be recognized that this method of providing for disengagement of the clutch 14 not only considerably simplifies the construction of this clutch but renders the assembly more compact and trouble-free. Pressure resulting from the action of centrifugal force upon oil within cylinder 34 is counterbalanced by the centrifugal effects of oil within the compartment 1 upon the other side of the plate 35, so that centrifugal forces upon plate 35 are substantially balanced at all times, and particularly when the clutch 14 is released it will be recognized that oil may be accommodated between plate 35 and annular wall 36B to counteract the centrifugal effect of oil within the cylinder 34. On the other hand, it will be observed that if the hydraulic torque converter is so designed that a relatively high pressure is employed within the torque converter casing, an even heavier pressure would be required to engage the clutch 14 were it not for the automatic pressure reducing function of the valve 61 which, cooperating with PC valve 47, causes a pressure drop within the hydraulic torque converter casing concurrently with the engagement of clutch 14. This arrangement is possible by reason of the fact that it is never necessary to engage the clutch 14 when the hydraulic torque converter is functioning either as a torque converter or as a hydraulic clutch. Even if the hydraulic converter is functioning as a simple hydrodynamic clutch to transmit torque, however, it is not necessary that the casing be under substantial hydrostatic pressure, so that the pressure supplied to the casing 1 through conduit 54 may be reduced very substantially, for example to 5 or 10 lbs. per square inch, without interfering with the ability of the hydrodynamic assembly to transmit torque at its maximum speed ratio (closest to 1 to 1) while as previously explained the pressure required to operate the clutch 14 is thereby reduced very substantially.

Since upon starting the pressure from supply passage 43 passes directly into the torque converter, by reason of the fact that PC valve 47 stands in the open (down) position when the system is at rest, the pressure builds up very rapidly within the torque converter casing, but this pressure is throttled gradually, as it approaches the desired value, by the closing effect of the pressure transmitted to the chamber 57.

The spring 75 and the linkage reacting upon the PC valve 48 are preferably so designed that when the accelerator is fully released the controlled pressure output of PC valve 48 is not high enough to actuate the brake bands or clutches, while such pressure may be gradually increased by depression of the accelerator, so that the rate of clutch engagement may be controlled by the operator. Another result of this arrangement is that with the engine idling the operator may place the hand lever 90 in any driving position, and the car will not move until the accelerator is depressed. As also previously pointed out, moving the control lever to any driving position from the neutral position does not cause the car to tend to creep since the transmission is in a completely neutral condition with all bands fully released until, by depression of the accelerator, one of the bands is caused to engage.

The arrangement of my improved control system not only gives the operator direct supervision over the rate of clutch engagement but insures smooth engagement of the brake bands and clutches under all conditions. It will be appreciated that the torque converter may have a substantial drag torque when the engine is idling under normal conditions, while the drag torque will be even greater under high-idle conditions when the engine is cold. This torque must be transferred smoothly when engaging the forward drive brake band or reverse drive brake band, and the engagement must be rapid enough so that the brake band is engaged before the engine has speeded up materially, to prevent the car from being started by the brake band instead of through the torque converter. The proper rate of engagement of the brake band is easily obtainable by properly designing the linkage connecting the accelerator with PC valve 48 and proper design of the spring 75. It is obvious that a light accelerator start, that is a gradual start resulting from light pressure upon the accelerator, does not speed up the torque converter very much and the engagement of the brake band can be relatively slow, and that this desirable action occurs by reason of the fact that relatively low pressure is exerted upon the spring 75 and resultantly upon PC valve 48 under these conditions. Upon a fast start, however, with heavy pressure upon the accelerator, the engine will speed up rapidly and the brake band must be engaged rapidly to insure that the starting load is taken by the torque converter rather than by the band itself, and this action is accomplished by the increased output pressure of PC valve 48 resulting from the heavier downward force exerted upon this valve by the spring 75 in response to the heavier accelerator pressure.

Under high-idle cold starting conditions, the drag torque of the hydraulic torque converter is so great that the brake band is required to take the load involved in starting the car. It is desirable in this case to slow up the rate of engagement of the forward drive brake band with relation to the accelerator setting, to insure a smooth start. This change of rate of engagement is accomplished by the connection between the biasing member 83 and the choke or idling control of the carburetor of the engine. Member 83 acts, as previously explained, to oppose the pressure of spring 75 during choking or high idling periods, so that it requires greater movement of the accelerator to obtain a given controlled clutch actuating pressure in the output supply line 70 leading from PC valve 48 to the actuating means for the clutches and brake bands.

With the car accelerating in the low speed drive, the slip of the hydraulic torque converter gradually decreases until the torque reaction upon reaction member 3 reverses in direction and the torque converter thereafter acts as a simple fluid coupling to permit the car to be accelerated through the two planetary gear trains up to the speed at which the upshift to third occurs under the prevailing conditions. It will be appreciated that the engagement of the third speed clutch 20 occurs at a speed which is a resultant of two factors, viz; car speed and accelerator position. The clutch 20 is of the multiple disk type which will engage smoothly with an engaging pressure in excess of the pressure just required to prevent the clutch from slipping. It is therefore not necessary to raise the clutch engaging fluid pressure by raising the piston valve 163, to provide a safety factor, as the area of the actuating piston plate 32 for clutch 20 may be large enough to allow the proper safety factor. If a different type of clutch were used for third speed, such as one of the type of single disk clutch 14, valve 163 could be employed to increase the pressure after clutch engagement as a safety factor, as will be discussed in greater detail hereinafter.

The bleed hole 170 which controls the rate of movement of the clutch pressure control valve 163 is of very small size, so that this valve may move only very slowly, assuring smooth clutch engagement even though the initial controlled pressure in a given accelerator setting is not quite enough to fully engage the clutch. The position of the discharge orifice 180 is high enough to insure that the valve 163 will rise sufficiently to insure adequate output pressure from PC valve 48 to provide a good safety factor for the clutch or clutches. In addition to insuring smooth clutch actuation, the pressure controlling valve 163 functions to prevent free wheeling upon lifting the foot from the accelerator under conditions such that the controlled pressure would drop to a point where the rear wheels could not turn over the engine through the clutch. The position of the discharge orifice 180 is high enough, however, so that the total downward pressure on the PC valve 48 insures adequate minimum pressure within the conduit 70 under these conditions to impart adequate torque capacity to the clutch for engine braking without danger of clutch slippage in high gear.

With further reference to the considerations involved in the obtaining of smooth engagement of the clutches and brake bands, it has been found that to obtain smooth engagement of a single plate type disk clutch the torque of the engine should be just about or slightly greater than the torque capacity of the clutch. The torque of the engine is related to the accelerator setting, and in my construction, therefore, the pressure control valve 48 is so connected to the accelerator by the linkage and spring means above described as to give a controlled output pressure related to the diameter of the clutch actuating piston in such manner as to impart to the clutch a torque carrying capacity properly related to the accelerator setting, or in other words which enables the clutch to carry a torque load which is approximately equal to or slightly less than the engine torque developed at any given accelerator setting.

At light accelerator pedal pressure, the engine torque is low and the torque capacity of the clutch (that is, the maximum torque which will not cause slippage of the clutch) must be low for smooth engagement, while at greater accelerator depression and higher engine torque the torque capacity of the clutch must be correspondingly higher. The pressure control valve 48 is capable of accomplishing proper torque balance between engine and clutch with high accuracy but it will be seen that in operating at or close to such balance, with a maximum clutch capacity about equal to the torque to be transmitted, slippage would obviously occur at times and rapid clutch wear could be expected. The supplemental clutch pressure control valve 163 and the means interconnecting it with the main pressure valve 48 provide means whereby the torque capacity of a clutch may be increased to a safe operating value providing an adequate safety factor while yet allowing low initial clutch capacity for smooth engagement.

In direct drive, it will be noted that the clutch 14 by-passes the hydraulic torque converter. This is advantageous for the reason that the torque converter would under such conditions be acting as a hydraulic clutch and when so operating such torque converters are not highly efficient, resulting in considerable slip and heat generation.

Both the governor operated valve 122 and the selector valve 88 provide for rapid release and draining of the actuating systems of clutches which are disengaged, and the operator may freely move the control lever 90 rapidly to any desired position without danger of simultaneous improper engagement of bands or clutches.

*Optional supplemental reaction means for low speed and reverse drives*

It will be seen that if the brake bands 17 and 21 are relied upon to hold the drums 16 and 19 stationary during reverse drive and locked up low-gear drive, respectively, without any supplemental holding means for these drums, the loading of these bands might become relatively high so that in the practical designing of a transmission, depending upon the intended loading of the parts, it might be necessary either to use large drums or to apply relatively heavy forces to the bands. It is, of course, desirable to hold the proportions of these parts down to the smallest practicable size, particularly in automobile transmissions, and the use of great forces is undesirable also, particularly since it results in heavy bearing loads and accordingly tends to shorten the life of the transmission.

Figure 5:
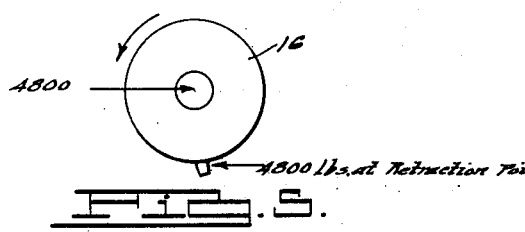
Figs. 5 and 6 are force diagrams.

In the case of the transmission illustrated in Fig. 1, if the reverse ratio for the gear train is of the order of 2 to 1, the torque required to hold the reverse brake drum, not including any torque increase that may occur in the hydraulic torque converter, is the engine torque times the gear ratio plus the engine torque, or $Q \times 2 + Q = 3Q$; Q representing the engine torque. If the hydraulic torque converter doubles the engine torque input, the actual torque required to hold the drum becomes 6Q in reverse at full load. With a construction such as that shown in Fig. 1, the result of this situation upon bearing loads may readily be perceived. If the engine torque is of the order of 2400 inch pounds, 14,400 inch pounds will be required to hold the reverse brake drum 16 against rotation at full load, and if the radius of the drum is 3 inches, the reaction force will be 4800 pounds. With the brake band anchored at one point, the resulting bearing load will also be 4800 pounds, as indicated in the simple force diagram, Fig. 5.

As the brake band is applied rapidly upon depression of the accelerator to start the car, so that the actual starting load is taken by the hydraulic torque converter rather than by slipping of the brake band, the brake drum is stopped before the engine has developed more than a small percentage of its full torque capacity.

Figure 2:
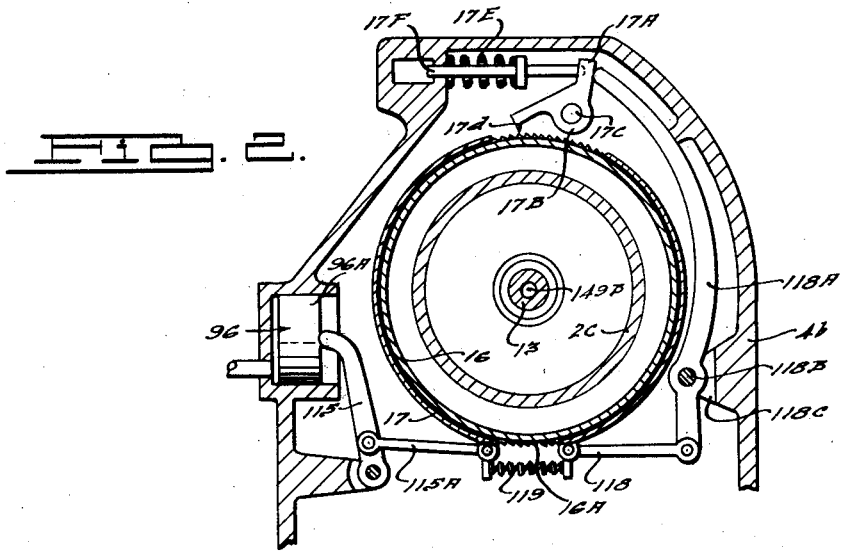
Fig. 2 is a cross section taken substantially on the line 2—2 of Fig. 1 and looking in the direction of the arrows.

The mechanism whereby this difficulty is overcome is best illustrated in Fig. 2. As there shown, the effort applied to the reverse band actuating piston 96A is transmitted to one end of the brake band 17 through the agency of a lever 115 and a link 115A connected to one end of the band. The resulting torque upon the band is applied to another link 118 similarly connected to the opposite end of the band. The other end of link 118 is pivotally connected to one arm of a lever 118A pivoted as at 118B upon a suitably formed supporting bracket portion 118C integrally carried by the internal wall of the case 4B. The other arm of the lever 118A extends upwardly within the case, its upper extremity bearing against an integral lug 17A forming an actuating arm for a pawl 17B pivoted upon a fixed pin 17C carried by the case. The nose portion 17D of the pawl is movable to and from holding engagement with an annular series of ratchet teeth 16A carried by the rim of the drum 16. The pawl is urged toward released position by a helical compression spring 17E reacting against the lug portion 17A upon the side opposite to that engaged by the lever 118A, the spring being carried and guided by a stem assembly 17F slidably fitted in a suitable guide hole (undesignated) in the interior of the casing, the outer end of the stem bearing against lug portion 17A.

Figure 6:
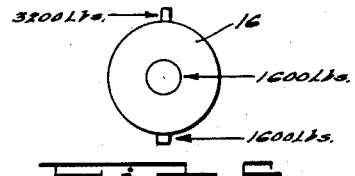

The reverse brake-applying motor assembly 96 may be so proportioned that it is capable of supplying only a fraction of the maximum force required to hold the drum against rotation at full load. For example, if the total reaction at full load is of the order of 4800 pounds, as indicated above, the total holding force applicable to the brake band by the motor may be but one-third of that figure, or 1600 pounds. The heavier loads, running up to the indicated maximum, are taken by the pawl assembly 17B which, it will be noted, is located opposite the first reaction point represented by the end of the brake band. The parts are so designed that the pawl is engaged before the reaction force reaches the maximum applicable by the brake, illustratively considered to be 1600 pounds, so that slipping of the drum can never occur. It will be seen that with the reaction points arranged opposite to one another, the bearing load will be zero, with the pawl engaged, until the maximum holding force applicable by the band is reached. After this force is exceeded, that is after the total required holding force passes 3200 pounds, bearing loads are created. However, for maximum engine torque, which produces a reaction force of 4800 pounds under the illustrative conditions assumed, the total bearing load would amount to only 1600 pounds, as indicated by the force diagram, Fig. 6.

The action of the mechanism brings the brake drum to a stop quickly but without severe shock, and the pawl is then applied to help take the torque reaction and to reduce the bearing load. This arrangement greatly reduces the necessary size of the brake drum and the force necessary to be applied to the brake band, as will be appreciated.

It is obvious that two such supplemental anchors could be employed instead of one as above described, which with the reaction force on the link 118 would give three reaction points, and if placed 120° from each other, the resultant bearing load would then be zero as the maximum reaction force could be 1600 pounds for each anchor point.

Without supplemental means to assist the holding effort of the forward drive brake band 27, it will also be appreciated that a relatively large force would be required to hold the forward drive brake drum 26, particularly in low gear under conditions at or close to a stall and with the engine delivering maximum torque. It has heretofore been considered that the forward brake band 27 takes the torque reaction of both sun gears in the first speed drive, but while the transmission could be constructed and arranged to operate in this manner, I preferably use the lock-up brake band 21 to assist the forward drive brake band 27 in first gear under heavy loads. Since the drum 19 is formed rigidly with the front sun gear 18, the full reaction of the front sun gear is taken by the lock-up brake band 21 when the latter band is engaged. At such time, therefore, the forward drive brake band 27 is only called upon to take the reaction of the rear sun gear 23. Since smaller forces are thus required at the band, this arrangement makes it possible to eliminate levers or other force multiplying means and to apply the thrust of the hydraulic motors 99, 102 directly to their brake bands.

It will be noted that the lock-up brake band 21 is not only applicable by the servomotor 102, which acts upon one end of the band, but is also applicable by a second servomotor 210 reacting against the opposite end of the band. The cylinder of the servomotor 210 is connected by conduit means 212 to two ports 214, 215 formed in the side wall of the speed-responsive valve casing 107. Port 214 communicates with an internal annular groove 107E while port 215 communicates with an internal groove 107F. With the selector valve in the forward drive position and the speed-responsive valve in the first speed position shown in Fig. 4, fluid under pressure from conduit 106 passes through valve chamber 122B and port 214 and then through conduit 212 to servomotor 210. At this time, the port 215 is cut off by the left end of the speed-responsive valve. The lock-up brake band 21 is accordingly applied by servomotor 210 while the transmission is in first speed and the effort required to hold the two sun gears is accordingly divided between the two bands 21, 27. When the governor valve moves to the left in response to increasing car speed, port 214 is closed off and port 215 is placed in communication with vent opening 151 by valve chamber 122C. The lock-up brake band is thereby released, as it is not required when the hydrodynamic transmission is acting simply as a fluid flywheel clutch without increasing the torque.

It will be seen that the supplemental applying means for the lock-up band might be omitted if not required by the designed torque loading of the parts, but that it is highly desirable from the standpoint of economy, and that this arrangement also provides a positive two-way drive in first speed rather than a free wheeling drive. A positive two-way drive is thus available in three of the four driving ratios.

Modification of Figure 7

In the modified arrangement of mechanical components shown in Figure 7, many of the components will be seen to correspond to those shown and described in connection with the first embodiment, and equivalent parts are designated by like reference characters distinguished by the addition of the exponent 2 to each. Many of these parts will be seen to require no detailed re-description.

This embodiment functions to disable the hydraulic torque converter in third speed as well as in direct drive, although in all other respect its operation is the same as that of the transmission first described. It will be noted that the clutch 20 of the embodiment of Figure 1 has been eliminated, and that a friction clutch assembly generally designated $20^2$ is provided at the front end of the assembly between the direct drive friction clutch $14^2$ and the hydraulic torque converter assembly. The clutch $20^2$ includes a driven disk $15^2$ which when the clutch is engaged is directly clamped to the clutch casing portion $6A^2$ which turns as a unit with the crankshaft $6^2$ and the pump element $1^2$ of the torque converter. The hub portion $9A^2$ of the planet carrier $9^2$ is extended forwardly in the form of a sleeve surrounding the shaft $13^2$, disk $15^2$ being keyed directly to the hub sleeve $9A^2$. The rearwardly extending portion of the hub $9A^2$ is directly connected to the rear internal toothed ring gear $10^2$ as in the previous embodiment.

It will be understood from the foregoing that when clutch $20^2$ is engaged, the internal toothed gear $10^2$ of the rear planet assembly is turned at engine speed. The rear clutch band $27^2$ is also engaged at this time with the drum $26^2$ and the rear sun gear $23^2$ is thereby held against forward rotation, so that the rear planet gears $37^2$ are rolled upon the sun gear and the tailshaft is accordingly turned at a reduced speed with the carrier $12^2$.

The other portions of the embodiment of Figure 7 function exactly as do the equivalent portions of the first described embodiment. It will be seen that in the embodiment of Figure 7 no torque is transmitted through the hydraulic torque converter in third gear or in fourth gear. This prevents any tendency of the torque converter to generate heat in these speeds.

Figure 8:
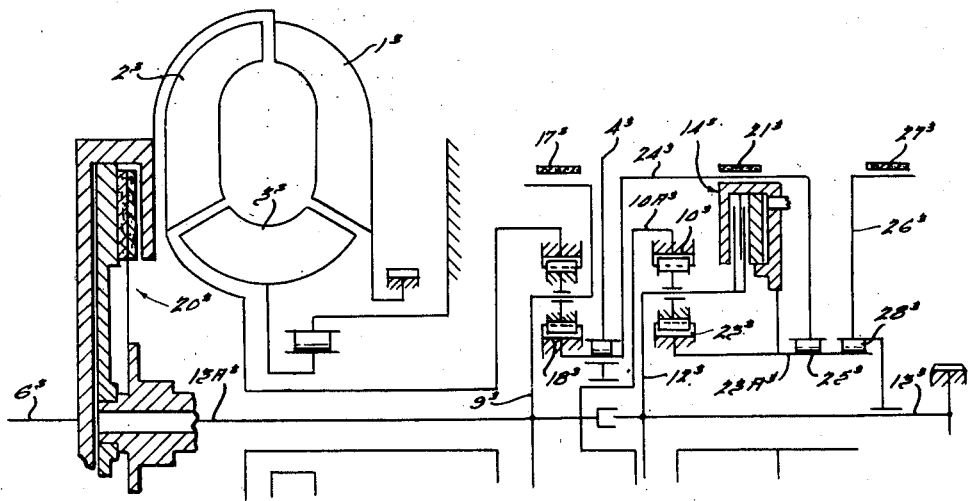

Modification of Figure 8

In the further modification shown in Fig. 8 in which certain of the mechanical components are somewhat differently arranged, parts analogous to those already described are designated by reference characters corresponding to those used in the description of the first embodiment, but distinguished by the exponent 3. Many of these will require no detailed redescription.

In this embodiment, a separate transmission shaft $13A^3$ is interposed between the driving crankshaft $6^3$ and the driven shaft $13^3$, the last-mentioned shaft being piloted in the rear end of the transmission shaft $13A^3$. The planet carrier $9^3$ for the front gear set is fast upon the transmission shaft $13A^3$, and the internal toothed ring gear $10^3$ is also rigidly carried by the drum $10A^3$ which is fast upon the rear end of the transmission shaft. The carrier $12^3$ for the rear planetary gears is fast upon the driven shaft $13^3$ while the sun gear $23^3$ is carried by a sleeve $23A^3$ rotatable upon the driven shaft. The front sun gear $18^3$ is rigidly attached to a drum assembly $24^3$ which is externally engageable by the lock-up brake band $21^3$. The direct drive clutch, generally designated $14^3$, is of the multiple-disk type, is housed within the drum $24^3$ and when engaged couples the rear planet carrier $12^3$ to the sun gear $23^3$, thereby locking up the rear planetary unit so that the two shaft portions $13^3$, $13A^3$ turn as a unit.

Both overrunning cluthes $25^3$ and $28^3$ are arranged on the hub $23A^3$, clutch $25^3$ being between the drum $24^3$ and the hub $23A^3$ and overrunning clutch $28^3$ being between the hub $23A^3$ and the forward drive brake drum $26^3$. The exterior of the latter drum is engageable by the forward drive brake band $27^3$.

The third speed clutch, generally designated $20^3$, is arranged at the front end of the assembly, in a position corresponding to that occupied by the direct drive clutch 14 of the first-described embodiment. When engaged, it will be seen that the clutch $20^3$ couples the crank shaft $6^3$ directly to the transmission shaft $13A^3$.

The action of the parts may be essentially the same as that of the previously described embodiment, and the same control system may be used. In reverse drive, brake band $17^3$ holds the planet carrier $9^3$ and this results in reverse rotation of the forward sun gear $18^3$ as in the first embodiment, the drive being through the hydraulic torque converter. The rear internal toothed gear $10^3$ is also held by the band $17^3$ and the rear sun gear $23^3$ is driven in a reverse direction by the drum $24^3$ and overrunning clutch $25^3$. The rear planet pinions are accordingly rolled upon the internal toothed gear $10^3$ to turn the driven shaft $13^3$ in reverse.

In first speed forward drive, the brake band $27^3$ is applied and holds both sun gears $23^3$, $18^3$ through the overrunning clutches $25^3$, $28^3$. The drive is then through the hydraulic torque converter and through both planetary gear units, as in the first-described embodiment, the third speed clutch $20^3$ being engaged after the hydrodynamic unit has reached its maximum speed ratio. With the third speed clutch $20^3$ engaged, forward drive brake band $27^3$ also remaining engaged and the direct drive clutch $14^3$ released, the front planetary gear set is eliminated from the drive, which is transmitted directly to the rear internal tooth gear $10A^3$. The rear sun gear $23^3$ is still held by the forward drive brake band and a reduced speed drive is effected through the rear planetary unit only. The direct drive clutch $14^3$ is engaged with the third speed clutch also still in engagement, so that both planetary units are locked up and a direct drive is afforded through the transmission.

This embodiment will be seen to possess certain advantages of arrangement. A multiple-disk direct drive clutch may be employed which is very smooth in action. Also the third speed clutch is moved to a forward position which permits an arrangement wherein the number of telescoping tubular shafts required is less than that of the embodiment of Fig. 7 despite the fact that similar action is achieved. It will be noted that in this embodiment, a single hub is employed as one element of both of the overrunning clutches $25^3$, $28^3$. This same arrangement may, of course, also be employed in the other embodiments previously explained. It is advisable in this modified construction also to pilot the rear end of the shaft $13A^3$ in a bearing secured in the transmission case as shown at $4^3$.

*Modified control system of Figs. 9–12*

In Figs. 9, 10, 11 and 12, I have shown a modified control system which is somewhat simplified with respect to the pressure controlling means. Parts analogous to those already described in connection with previous embodiments are identified by like reference characters distinguished by the addition of the exponent 4 to each, and many of these will be seen to require no detailed re-description. The output pump pressure is delivered directly from the supply conduit $43^4$ to selector valve groove $93^4$ by way of a branch conduit $70^4$. The pressure thus delivered to the selector valve is limited to a predetermined value (e. g. 75 lbs., per square inch) by means of a pressure limiting valve designated $48^4$ and consisting of a simple piston member which is urged upwardly against pump pressure by a spring $75^4$. The pump pressure keeps the valve $48^4$ open, and the overflow therefrom passes through a lateral branch port and connected conduit $180$ to a conduit $54^4$ leading to the interior of the hydraulic torque converter casing $1$ as in the previous embodiment. The pressure in conduit $54^4$ and accordingly in the torque converter is limited by a pressure relief valve generally designated $47^4$ having a lateral overflow port $47A^4$ and connected passage $51^4$ returning to the sump. The valve is urged toward closed position by a spring $66^4$ which is so proportioned that the output pressure delivered to the hydraulic torque converter casing is of a predetermined value, for example, of the order of 25 lbs. per square inch.

The operation of the selector valve $88^4$ is the same as for that of the embodiment last described, and this valve is shown in Fig. 9 in the position for reverse drive. A somewhat different arrangement is employed to prevent unduly rapid engagement of the brake bands and clutches without interfering with rapid disengagement thereof. This action is achieved by providing a relatively narrow groove $200$ in the portion $109A^4$ of the valve corresponding to the land $109A$ of the first embodiment, located at the extreme right end of the valve as viewed in the drawings. The groove $200$ is connected to the valve chamber $108A^4$ by a fine bleed passage $201$, and it will be seen that with the valve in the extreme right-hand or reverse drive position the groove $200$ registers with the internal channel $94^4$ which is connected by conduit $95^4$ with the actuating means for the reverse brake band, so that with the valve in this condition the fluid must pass through the bleed passage $201$ to reach such actuating means and the rate of application of the reverse brake band is thereby limited. When the valve is moved to the left, however, to the neutral and the other driving positions, the channel $94^4$ is immediately fully opened so that the pressure in the actuating means for the reverse band may be dumped through the open right end of the valve casing, effecting release of the brake band so rapidly that the action is virtually instantaneous.

In the land or spool $109B^4$ which corresponds generally to the spool portion $109B$ of the selector valve of the first described embodiment, a narrow groove $202$ similar to the groove $200$ is provided which is connected to the valve chamber $108A^4$ by a fine bleed passage $205$. Thus, in the forward drive position, shown in Fig. 11, the fluid entering through conduit $70^4$ must pass from the chamber $108A^4$ through the fine passage $205$ to reach the narrow groove $202$ which is then in registry with the internal channel $97^4$ to which the conduit $98^4$ leading to the actuating means for the forward drive brake band is connected as in the previous embodiment. Thus the rate of engagement of such brake band is limited to a desired value by the rate at which fluid may pass through the passage $205$. It will be seen upon examination of Fig. 9, however, that when conduit $98^4$ is to be connected to drain, to release the forward drive brake band while the selector valve is in the neutral or reverse position, the selector valve is so moved that its open chamber $108B^4$ establishes direct communication between the channel $97^4$ and discharge port $104^4$. This will be seen to provide instantaneous release of the forward drive brake band.

Figure 3:
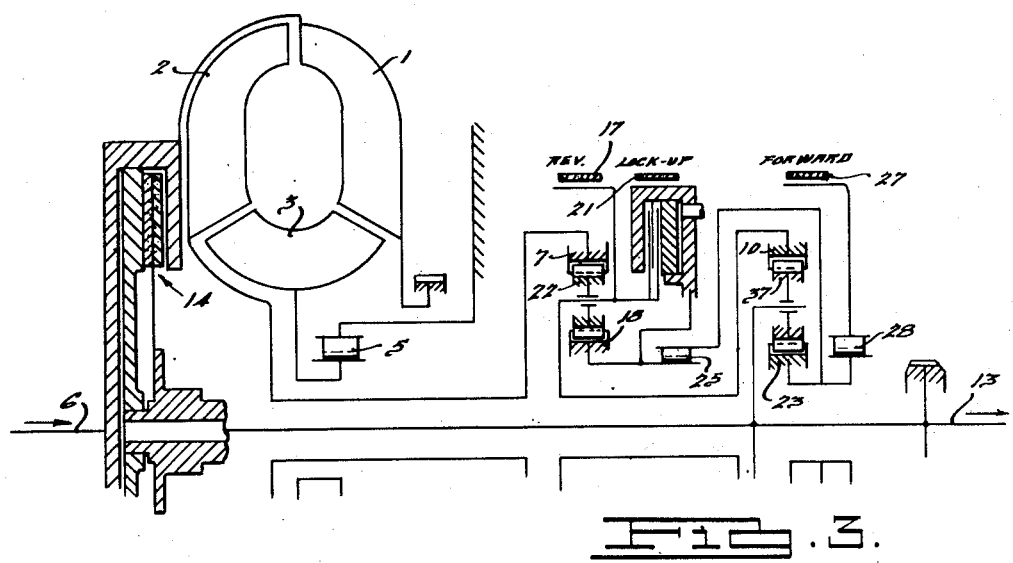
Fig. 3 is a schematic diagram of the principal mechanical components of the transmission showing the paths of power flow therethrough in the several driving ratios.
Figure 2:
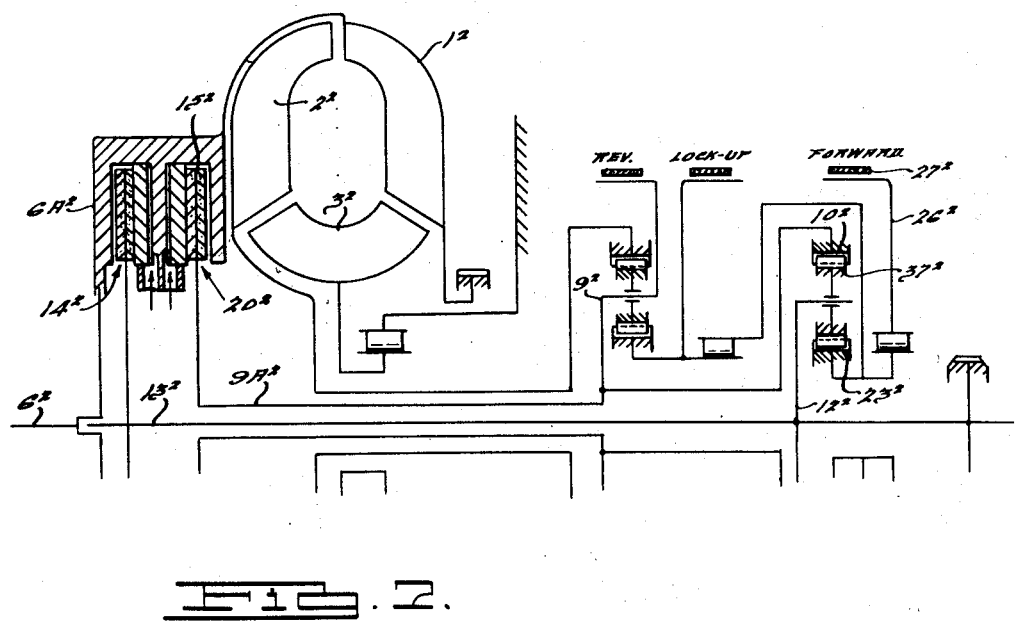

When the selector valve is moved from the forward drive position to the lockup position, groove $202$ is moved into registry with channel $100^4$ and it becomes necessary for the fluid employed to actuate the lockup brake band to pass through the restricted channel $205$ in order to reach the channel $100^4$ and connected conduit $101^4$ leading to the actuating means for the lockup brake band. The lockup band may thus grip its drum only in a controlled and gradual manner assuring smooth taking up of the load. Such movement of the valve $88^4$ from the forward drive position to the lockup position places the channel $97^4$ in open communication with valve chamber $108A^4$, maintaining the actuating pressure upon the servomotor assembly as $99$ (Fig. 3) for the forward drive brake band. It will also be seen that upon movement of the selector valve to the right, as viewed in the drawing, or away from the lockup position, the channel $100^4$ is instantly fully opened to the discharge port $104^4$, insuring rapid release of the lockup brake band.

The valve $122^4$ is movable by speed responsive governor means generally designated $139^4$, which is provided to control the action of such valve and which is similar to the governor means of the first embodiment. The speed responsive valve also incorporates built-in throttling means for controlling the rate of application of the third speed and direct drive clutches. A narrow groove 203 is formed in the spool portion 152⁴, corresponding to the spool portion 152 of the governor valve of the first described embodiment, groove 203 being connected to valve chamber 122B⁴ by a restricted passage 207 through which the fluid must pass to reach the conduit 149A⁴ when engagement of the third speed clutch is to be initiated, and through which the fluid must also flow in order to reach the passage 150⁴ through which the fluid flows to the direct drive clutch, as in the first embodiment. It will be seen that upon shifting of the speed responsive valve to the position corresponding to actuation of the third speed and direct drive clutches, the valve 122⁴ stops first with the groove 203 in registry with groove 107B⁴ and then with groove 107C⁴ and that the throttling action of the passage 207 controls the rate of engagement of the third speed and direct drive clutches in each such instance, in the same manner that the rate of engagement of the reverse and forward brake bands is controlled by the passages 201, 205 of the valve 88⁴. In like fashion also when valve 122⁴ moves in the opposite direction to effect a downshift, quick clutch release results because as the land 152⁴ passes to the right of the passage leading to each clutch, the clutch is immediately provided with an unrestricted connection to vent port 151⁴ through valve chamber 122C⁴.

*Modified control system of Figs. 13 and 14*

In Figs. 13 and 14, I have depicted a further modified control system utilizing similar fluid pressure supply means to the embodiment last described, the selector valve and the speed-responsive valve being the same as those used in the first-described embodiment, and additional accelerator-operated valving means of novel character being provided for throttling the fluid supply to the several servomotors and thus regulating the rate of engagement of the clutches and brake bands, the accelerator operated valving means also being employed to eliminate the unwanted effects of the drag torque of the hydraulic torque converter and thus to prevent "creep" of the vehicle. Parts analogous to others previously described are designated by reference characters which are similar but distinguished by the exponent 5.

Fluid at a controlled predetermined pressure is supplied through a conduit 70⁵ to the inlet channel 93⁵ of the selector valve 88⁵. The same system is arranged to supply fluid at a reduced pressure to the hydraulic torque converter casing through a conduit 54⁵, the pressure in the lines 70⁵ and 54⁵ being determined by pressure regulating valves 48⁵ and 47⁵, respectively, corresponding to the pressure regulating valves 48⁴ and 47⁴ of the last embodiment.

Fluid from all of the output channels of the selector valve, with exception of the channel 101⁵ connected to the lock-up band servomotor 102 is conducted to the cylindrical casing 302 of a valve 300 adapted to be actuated by the accelerator pedal and which will hereinafter be referred to as the "accelerator valve." The accelerator valve is indicated as adapted to be connected to the accelerator linkage as by means of a link 301 through the agency of which the valve 300 is moved to the left as the accelerator is depressed in opening the throttle, and moved to the right in response to release of the accelerator pedal. The valve is depicted in its extreme right-hand or closed-throttle positioning in Fig. 13.

The conduits 95⁵, 98⁵ and 106⁵ are connected to circumferentially spaced ports 306, 307, 308, respectively, formed in and extending radially through the wall of the valve casing 302. The valve element 300 is of smooth cylindrical form and is provided with three longitudinal slots formed in its surface, one underlying and adapted to travel across the inner end of each of the ports 306, 307 and 308, the corresponding slots in the valves being respectively designated 309, 310 and 311. The slots are of small and tapering cross-sectional area. The slot 309 bridges and provides communication between the port 306 and a port 312 to which a conduit 95A⁵ is connected. Conduit 95A⁵ forms a continuation of the conduit 95⁵ and extends to the actuating servomotor assembly 96 for the reverse drive brake band 17. The slope and proportions of the throttling slot 309 are of such character that with the accelerator valve in its closed or right-hand position only a very fine connecting passage is provided between the ports 306, 312, while the effective cross-sectional area of the throttling slot 309 is increased as the valve 300 is moved to the left in response to depression of the accelerator pedal. It will be seen that the rate of engagement of the reverse drive brake band may thus be controlled in proportion to the movement of the accelerator.

The slot 310 performs a similar function in providing restricted and graduatedly controllable communication between the passage 98⁵ and a continuation conduit 98A⁵, the latter extending to the forward drive servomotor 99. The slot 310 is correspondingly graduated to provide a bridging connection of variable capacity between the ports 307, 313 to which the ends of conduit portions 98⁵, 98A⁵ are respectively connected.

Likewise the slot 311 provides communication between the ports 308, 314, which respectively communicate with the conduit 106⁵ and with the continuation conduit 106A⁵, the latter leading from the valve casing 302 to the speed responsive valve casing 107⁵ as in the first embodiment. It will be seen that this arrangement provides for similar control of the rate of fluid delivery to and engagement of the third speed and direct drive clutches 20, 14.

A channel 315 is also formed in and extends longitudinally along the surface of the valve 300 in line with but separated from slot 309. Channel 315 is of adequate depth and width to provide quick relief of any pressure existing in the reverse drive servomotor system and is so positioned as to provide a bridging connection between the port 312 and a vent port 303A formed in the side of the casing when the accelerator valve is in the right-hand position. The slot 309 and channel 315 are separated by a land 318 which is narrower than the port 312 and which is so located when the accelerator valve is in its right hand position that the slot and channel both overlap the port at that time. The discharge from port 303A may return to the sump. It will accordingly be understood that when the accelerator pedal is completely freed, the reverse band is completely released so that the drag torque of the hydraulic torque converter cannot cause the vehicle to creep while standing with the accelerator pedal released and the control lever in the reverse position.

A channel 316 similar to channel 315 provides connection between the port 313 and an escape port 303B when the accelerator pedal is released, to insure release of the forward drive brake band by venting its servomotor 99 and connected conduit system whenever the accelerator pedal is released while the vehicle is standing with the control lever 90 in the forward position.

In order to prevent such venting when the vehicle is in motion or traveling at a rate exceeding a predetermined speed, and thus prevent freewheeling action from occurring whenever the accelerator pedal is released with the car traveling in high gear, an arrangement similar to that incorporated in the first-described embodiment is provided, the discharge port 303B being connected by a conduit 304 to the port 173$^5$ of the speed-responsive valve assembly. With the accelerator valve in the extreme right-hand position, the shallower left end of the throttling slot 311 slightly overlaps the port 314, while the vent slot 316 substantially overlaps port 313. The slight metered quantity of fluid which can pass into the conduit 98A$^5$ cannot develop actuating pressure in the forward drive servomotor 99 while the vent slot 316 is functioning, that is, while the car is at rest, for the reason that a venting connection is established with port 313 by way of slot 316, port 303B, conduit 304, port 173$^5$, and the slot 122A$^5$ formed in the speed-responsive valve 122$^5$. The speed-responsive valve construction corresponds to that of the first-described embodiment, and the fluid entering the slot 122A$^5$ passes through the port 174$^5$ into the internal passage 123$^5$ in the valve, traveling longitudinally through such passage and out the port 175$^5$, whereafter it passes through the valve chamber 122C$^5$ and out the escape port 151$^5$ from which it may return to the sump. It will be seen that when the speed-responsive valve 122$^5$ is in any but the extreme righthand position the vent conduit 304 is cut off by disalignment of the slot 122A$^5$ with respect to the port 173$^5$. Pressure may therefore be maintained or built up in the conduit 98A$^5$ and connected servomotor 99 to maintain or induce application of the forward drive brake band 27. The rate of application is dependent upon the positioning of the accelerator and it will be perceived that the rate of engagement of the band is proportionately increased as the accelerator is depressed to gradually increase the effective cross-sectional area of the portion of the slot 310 forming the bridging connection between the ports 307, 313.

When the selector valve is in the position for forward, the fluid is directed by conduit 106$^5$, 106A$^5$ to the speed responsive valve 122$^5$ to control the engagement of the clutches. Since the ports 308, 314 and the slot 311 form the bridging connection between the conduits 106$^5$ and 106A$^5$, the rate of engagement is dependent upon the positioning of the accelerator and it will be perceived that the rate of engagement of the clutches is proportionately increased as the accelerator is depressed to gradually increase the effective cross-sectional area of the slot 311 forming the bridging connection between the ports 308, 314.

It will be recognized that with this construction, individual throttling means are provided for the several brake bands and clutches, and that each throttling means may be proportioned to give the best results for the particular applying means which it controls. The tapering contour of the grooves also provides a simple but very effective means for controlling the rate of application in response, and proportionally to, accelerator actuation, permitting more rapid application as the accelerator is depressed, and vice versa. The accelerator valve performs the further function of insuring a complete elimination of driving torque when the accelerator is completely released, except when the car is traveling above a predetermined speed while at the same time preventing any possibility of creep of the vehicle when it is intended that it shall remain stationary.

Figure 15:
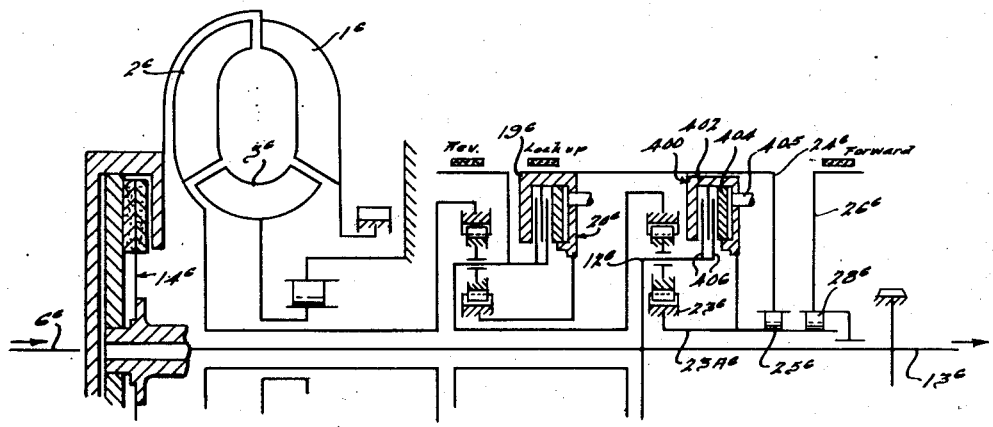
Fig. 15 is a view similar to Figs. 3, 7 and 8, showing another modified construction.

Modification of Fig. 15

In Fig. 15, I have illustrated another somewhat modified arrangement of certain of the major mechanical components of the transmission. In this modification, parts corresponding to those previously described are designated by like reference characters distinguished by the exponent 6. It will be recognized that the general arrangement of parts corresponds to that of the first embodiment, except that an additional friction clutch is incorporated for locking up the rear planetary gear set. The lockup clutch for the rear planetary gear set is indicated as arranged to clutch together the rear planetary cage 12$^6$ and the rear sun gear 23$^6$, although it will be recognized that any two parts of the rear planetary set might be clutched together for the purpose of forcing the rear planetary system to rotate as a unit, to accomplish the same results. The rear lockup clutch unit is generally designated 400 and comprises a drum-type housing 402 rigidly attached to the sun gear hub 23A$^6$ and containing a plate-type piston 404 actuatable by fluid under pressure delivered to the interior of the drum 402 through suitable connecting means, such as the conduit 405 to clamp the drum together with a set of clutch plates 406 connected to and rotatable as a unit with the cage 12$^6$.

In this embodiment the overrunning clutch assembly 25$^6$ is also mounted upon the rear sun gear hub 23A$^6$ beside the overrunning clutch 28$^6$ for the forward drive brake drum 26$^6$. The arrangement in this respect corresponds to that of Fig. 8 and the outer race of overrunning clutch 25$^6$ is connected to the combined lockup brake drum and third-speed clutch casing portion 19$^6$ by an extension drum portion 24$^6$.

It will be recognized that with this construction a direct drive through both planetary gear units may be effected by simultaneously engaging the two friction clutch assemblies 20$^6$, 400, and that if this is done without engaging the direct drive clutch 14$^6$, the hydraulic torque converter remains effective while a direct drive is provided through the gearing. The hydraulic torque converter may thus be used for all ratios including high, and it will be appreciated that for low speed operation in high gear added flexibility is thereby achieved, as for example when driving in traffic or in cities where considerable maneuvering and turning of corners at low speeds, and accelerating the vehicle at relatively low speed in high gear are involved, as distinguished from higher speed operation.

It will be recognized that the supply of pressure fluid to the conduit 405 to operate the rear lockup clutch assembly may be controlled manually, or by speed-responsive means so arranged as to disable this lockup clutch when operating at speeds above 25 or 30 miles per hour. When operating at such higher speeds, it is more desirable to use the direct drive clutch 14$^6$, eliminating the hydraulic torque converter and thereby reducing heat generation and increasing the overall efficiency of the transmission.

It is believed that the other components of this embodiment, since they function in the same way as the corresponding parts of the embodiment first described, will require no detailed redescription.

Figure 16:
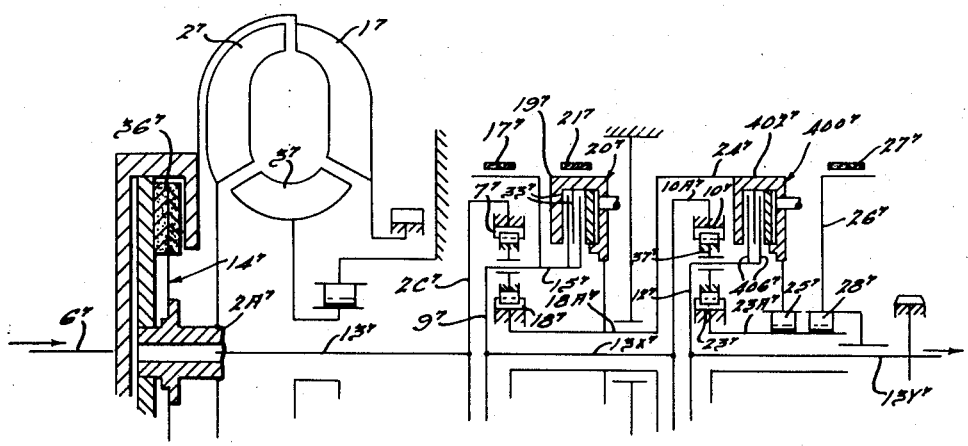
Fig. 16 is a view similar to Fig. 15 showing another modification Referring to the drawings.

*Modification of Fig. 16*

The further modification depicted diagrammatically in Fig. 16 will be seen to correspond to that of Fig. 15 in many respects, although it is to be noted that the clutch $14^7$ acts only as a lock-up for the hydrodynamic unit. The driving portion of clutch $14^7$ rotates with the driving portion $1^7$ of the hydrodynamic unit, while the driven clutch element $36^7$ is keyed to the same hub $2a^7$ which carries the turbine member $2^7$. The shaft $13^7$ is thus drivable through the hydrodynamic assembly when the clutch $14^7$ is disengaged, while this shaft is directly drivable by the crankshaft $6^7$ through the friction clutch $14^7$ when the latter is engaged.

The shaft $13^7$ extends rearwardly only far enough to connect to the cage $2C^7$ which carries the internal toothed gear $7^7$ of the forward planetary gear set. A clutch assembly $20^7$ is provided by means of which the front planetary set can be locked up for direct drive, one of the clutch portions as $15^7$ being directly connected to the planet cage $9^7$, while the other clutch portion $33^7$ is connected to the drum $19^7$ and to the sun gear $18^7$.

Reverse and lock-up brake bands $17^7$, $21^7$ respectively are provided, arranged similarly to the corresponding elements of the embodiments previously described, and it will be seen that this arrangement permits transmitting to the output shaft $13X^7$ of the front planetary unit, a reverse drive, or a reduced forward speed or direct forward speed drive.

The output shaft $13X^7$ of the forward planetary unit extends rearwardly only far enough for connection with the carrier $10A^7$ for the rear internal toothed gear $10^7$. The rear planetary unit also corresponds to the planetary units of the previously described embodiments, although it will be noted that the output shaft $13Y^7$ of the transmission is connected to and drivable only through the cage $12^7$ which carries the planet pinions $37^7$ of the rear planetary gear set.

The forward sun gear $18^7$ and driven member $19^7$ of the lock-up clutch assembly $20^7$ are connected through a sleeve $18A^7$ and drum $24^7$ to a rear lock-up clutch assembly generally designated $400^7$. The driving element of this clutch is designated $402^7$, and the driven plates thereof, designated $406^7$, are connected to the planet cage $12^7$ as in the last-described embodiment. Drum $24^7$ and the other connected elements will also be seen to be connected through the agency of an overrunning clutch $25^7$ to the hub $23A^7$ which carries the sun gear $23^7$ of the rear planetary gear set. The forward drive reaction brake drum $26^7$ is similarly connected through an overrunning clutch $28^7$ with the hub $23A^7$ and is adapted to be held by a forward drive brake band $27^7$.

Other portions of this embodiment corresponding to elements of previously described embodiments are also designated by like reference characters distinguished by the exponent 7, and will be seen to require no detailed redescription. It will be appreciated without detailed tracing of the paths of torque transmission through the various components that when both of the lock-up clutches $20^7$ and $400^7$ for the planetary gear sets are released, and clutch $14^7$ is also released, the drive from the engine passes through the hydraulic torque converting unit to the forward internal toothed gear $7^7$, and that the front planetary unit transmits a reduced speed drive to the rear internal toothed gear $10^7$, the rear planetary unit further reducing the speed as it drives the output shaft $13Y^7$. After the speed of the vehicle has advanced beyond that at which it would be normally operated in first gear, the clutch $14^7$ may be engaged, as well as one of the lock-up clutches as $20^7$. It will be seen that this will result in the transmission of a direct drive to the external toothed gear $10^7$ of the rear planetary gear set, which latter gear set will then afford the only speed reduction. This may correspond to the third speed drive, while when the rear clutch as $400^7$ is also engaged, the clutches $20^7$ and $14^7$ remaining engaged, a direct drive is transmitted to the output shaft $13Y^7$.

With the embodiment of Fig. 16, it will also be seen that the clutch $14^7$ can be used to lock out the hydrodynamic unit while both gear trains remain effective. It is thus possible to operate the transmission with considerable gear reduction while no torque is required to be handled by the hydrodynamic unit, which conduction may be desirable where the vehicle is required to work under unusual loads for extended periods of time, as where, for example, a trailer or other heavy load is to be pulled in hilly or mountainous regions or where, due to some other unusual condition, it is desired to operate in the gears for long periods of time. At such times the ability to transmit torque directly past the hydrodynamic unit somewhat increases the overall efficiency of the transmission assembly and reduces heating, as will be apparent. It will further be observed that with this embodiment the hydraulic torque converter is usable in all ratios including high.

The terms "brake" and "braking means" as used in the specification and claims hereof are intended to be construed broadly to include any mechanism for arresting, holding or limiting the rate of rotation or movement of a member.

The arrangement of the parts is such that when the transmission is in second gear, it is impossible for the vehicle to roll rearwardly. It is of course an optional matter in the arrangement of the controls whether the system is arranged to start the car in low gear or in intermediate gear. Where the ratio of horsepower to weight is sufficiently high, it may often be desirable to start in the second gear under normal driving conditions, and to use the low gear only as an emergency range to which a manual shift may be made. This is a frequent practice in the art. When the system is arranged to start in second gear, the parts prevent the vehicle from rolling rearwardly when standing in the second gear position with the engine idling. Referring to the embodiment of Figs. 1 and 3, for example, a reverse torque is at such time applied to the rear carrier 12. The rear sun gear 23 cannot turn rearwardly because the band 21 is applied and the reverse torque from the rear wheels locks up the overrunning clutch 28. The rear internal gear 10, therefore, tends to turn rearwardly, but the clutch 20 is engaged and the internal gear 10 is locked rigidly with respect to the front sun gear 18 through the hollow shaft portion 9a, front carrier 9 and clutch 20. Since the front sun gear and clutch housing drum 19 are held against rearward rotation by the overrunning clutch 25 which transmits its reverse torque through overrunning clutch 28 to the band 27, reverse movement of the propeller shaft 13 and the vehicle cannot take place. The turbine member 2 of the hydraulic torque converter is held stationary at such time.

It will be apparent that various other modifications and changes may be introduced without departing from the fair and proper scope of the subjoined claims.

I claim:

1. In a transmission construction, a front planetary gear set, a rear planetary gear set, each gear set having an outer gear, an inner gear, planetary gears, and a carrier for the planetary gears, means to transmit a drive to the outer gear of the front set, releasable means for holding the inner gears of both sets against backward rotation, means connecting the carrier of the front set to the outer gear of the rear set, means to take a drive from the carrier of the rear set, overrunning means connecting the inner gears of the two sets together for backward drive of the inner gear of the rear set by the inner gear of the front set, and for forward drive of the inner gear of the front set by the inner gear of the rear set only, and means for holding the carrier of the front set and the outer gear of the rear set against undesired rotation.

2. Means as set forth in claim 1 in which said means for holding both of the inner gears against backward rotation acts upon one of said gears through said overrunning means.

3. Means as set forth in claim 1 in which said means for holding both inner gears against backward rotation acts upon the front inner gear through said overrunning means to arrest rotation of said front inner gear element, and supplemental holding means acting to restrain rotation of said front inner gear independently of said above mentioned holding means.

4. Means as set forth in claim 1 in which said means for holding the carrier of the front set and the outer gear of the rear set against rotation comprises friction braking means for arresting such rotation, and positive abutment type supplemental holding means for locking said carrier and said outer gear against rotation.

5. Means as set forth in claim 1 in which said means for holding the carrier of the front set and the outer gear of the rear set against rotation comprises friction braking means for arresting such rotation, positive abutment type supplemental holding means for locking said carrier and said outer gear against rotation, and separate anchoring means for said braking means and said supplemental holding means, said anchoring means being peripherally spaced from one another.

6. Means as set forth in claim 1 in which said means for holding both of the inner gears against backward rotation acts upon one of said gears through said overrunning means, and additional overrunning means interposed between said means for holding both inner gears and both of said inner gears, and adapted to prevent backward rotation of both of said inner gears when said holding means for the inner gears is engaged.

7. In a transmission construction, a front planetary gear set, a rear planetary gear set, each gear set including a pair of gears and each set also including planetary gears connecting the gears forming the pair of that set, each set also including a carrier for the planetary gears, means for imparting a drive to one gear of the front set, braking means for arresting rotation of the other gear of the front set and one gear of the rear set, means connecting the carrier of the front set to the other gear of the rear set, means for taking a drive from the carrier of the rear set, overrunning means connecting the gears acted upon by said braking means to enable backward drive of such gear of the rear set by such gear of the front set, and braking means for arresting rotation of the carrier of the front set and the gear of the rear set connected thereto.

8. In a transmission construction, a front planetary gear set, a rear planetary gear set, each gear set having an outer gear, an inner gear, planetary gears, and a carrier for the planetary gears, means to transmit a drive to the outer gear of the front set, releasable means for holding the inner gears of both sets against backward rotation, means connecting the carrier of the front set to the outer gear of the rear set, means to take a drive from the carrier of the rear set, overrunning means connecting the inner gears of the two sets together for backward drive of the inner gear of the rear set by the inner gear of the front set, and for forward drive of the inner gear of the front set by the inner gear of the rear set only, means for holding the carrier of the front set and the outer gear of the rear set against undesired rotation, lock-up braking means connected to said inner gear of the front set at a point between said gear and said overrunning means and adapted to hold said gear against rotation in either direction, said lock-up braking means thereby also acting through said overrunning means to hold said inner gear of the rear set against forward rotation, whereby when said lock-up braking means is engaged concurrently with said means for holding the inner gears against backward rotation, both of said gears are held against rotation in either direction.

9. In a transmission construction as defined in claim 7, anchoring means for said last-mentioned braking means adapted to take the torque reaction resulting from application of such braking means, and supplemental holding means for said same carrier and gear including a dogging member actuatable by and in response to the torque reaction exerted upon said anchoring means, and abutment portions rotatable with said carrier and engageable by said dogging member.

10. Means as set forth in claim 9 including means yieldably opposing engagement of said dogging member and urging the same toward released position with respect to said abutment portions, whereby said dogging member is engageable when the torque reaction resulting from application of said braking means exceeds a predetermined value.

11. In a transmission, the combination of a drive member, a driven member, a front planetary gear set, a rear planetary gear set, each of said gear sets having three elements, means connecting one of the elements of said front set with said drive member and means connecting one of the elements of said rear set with said driven member, means connecting another of said elements of said front set with another of said elements of said rear set, and reaction means for completing a drive through the transmission and including means for holding the remaining one of said elements of one of said gear sets against rotation for providing a reaction member for said last-named gear set and overrunning means connecting the remaining one of said elements of the other of said gear sets with said first-named remaining element so as to hold said second-named remaining element against rotation for providing a one-way operative reaction member for said last-named gear set.

12. In a transmission, the combination of a drive member, a driven member, a front planetary gear set, a rear planetary gear set, each of said gear sets having three elements, means connecting one of the elements of said front set with said drive member and means connecting one of the elements of said rear set with said driven member, means connecting another of said elements of said front set with another of said elements of said rear set, and reaction means for completing a drive through the transmission and including a releasable brake for holding the remaining one of said elements of one of said gear sets against rotation for providing a reaction element for said last-named gear set and overrunning means connecting the remaining one of said elements of the other of said gear sets with said first-named remaining element so as to hold said second-named remaining element against rotation for providing a one-way operative reaction member for said last-named gear set.

13. In a transmission, the combination of a drive member, a driven member, a front planetary gear set, a rear planetary gear set, each of said gear sets having three elements, means connecting one of the elements of said front set with said drive member and means connecting one of the elements of said rear set with said driven member, means connecting another element of said front set with another element of said rear set, and reaction means for completing a drive through the transmission and including means for holding the remaining element of said rear set against rotation for providing a reaction member for said rear set and overrunning means connecting the remaining element of said front set with said remaining element of said rear set so as to hold the said remaining element of the front set against rotation for providing a one-way operative reaction member for said front set.

14. In a transmission, the combination of a drive member, a driven member, a front planetary gear set, a rear planetary gear set, each of said gear sets having three elements, means connecting one of the elements of said front set with said drive member and means connecting one of the elements of said rear set with said driven member, means connecting another element of said front set with another element of said rear set, means for holding the remaining element of said rear set against rotation for providing a reaction member for said rear set, overrunning means connecting the remaining element of said front set with said remaining element of said rear set so as to hold the said remaining element of the front set against rotation for providing a reaction member for said front set, so that said two gear sets provide a low speed drive between said drive and driven members and clutch means for locking elements of said front set to rotate as a unit so that said overrunning means overruns and said rear set provides a higher speed drive between said drive and driven members.

15. In a transmission, the combination of a drive member, a driven member, a front planetary gear set, a rear planetary gear set, each of said gear sets having three elements, means connecting one of the elements of said front set with said drive member and means connecting one of the elements of said rear set with said driven member, means connecting another element of said front set with another element of said rear set, and means for holding the remaining element of said rear set against rotation and including one-way engaging means and another one-way engaging means connecting the remaining element of said front set with said remaining element of said rear set so as to hold the said remaining element of the front set against rotation for providing one-way operative reaction members for both of said sets.

16. In a transmission, the combination of a drive member, a driven member, a front planetary gear set, a rear planetary gear set, each of said gear sets having three elements, means connecting one of the elements of said front set with said drive member and means connecting one of the elements of said rear set with said driven member, means connecting another element of said front set with another element of said rear set, and reaction means for completing a drive through the transmission and including a releasable brake for holding the remaining element of said rear set against rotation for providing a reaction member for said rear set and overrunning means connecting the remaining element of said front set with said remaining element of said rear set so as to hold the said remaining element of the front set against rotation for providing a one-way operative reaction member for said front set.

17. In a transmission, the combination of a drive member, a driven member, a front planetary gear set, a rear planetary gear set, each of said gear sets having three elements, means connecting one of the elements of said front set with said drive member and means connecting one of the elements of said rear set with said driven member, means connecting another element of said front set with another element of said rear set, means for providing drives through one or both of said gear sets and including means for holding the remaining element of said rear set against rotation comprising one-way engaging means and another one-way engaging means connecting the remaining element of said front set with said remaining element of said rear set so as to hold the said remaining element of the front set against rotation for providing reaction members for both of said sets, and a clutch for directly connecting said driving and driven members for a direct drive therebetween.

18. In a transmission, the combination of a drive member, a driven member, a front planetary gear set, a rear planetary gear set, each of said gear sets having three elements, means connecting one of said elements of said front set with said drive member, means connecting one of said elements of said rear set with said driven member, means connecting another element of said front set with another element of said rear set, means for holding the remaining element of said rear set against rotation and including one-way engaging means and another one-way engaging means connecting the remaining element of said front set with said remaining element of said rear set so as to hold the said remaining element of the front set against rotation for providing reaction members for both of said sets for a speed ratio drive between said drive and driven members, clutch means for locking elements of one of said sets together for providing another speed ratio drive between said drive and driven members, and a clutch for directly connecting said driving and driven members for a direct drive therebetween.

19. In a transmission, the combination of a drive member, a driven member, a front planetary gear set, a rear planetary gear set, each of said gear sets having three elements, means connecting one of the elements of said front set with said drive member and means connecting one of the elements of said rear set with said driven member, means connecting another element of said front set with another element of said rear set, means for holding the remaining element of said rear set against rotation for providing a reaction member for the rear set, overrunning means connecting the remaining element of said front set with said remaining element of said rear set so as to hold the said remaining element of the front set against rotation for providing a reaction member for said front set, and a clutch for directly connecting said driving and driven members for a direct drive therebetween.

20. In a transmission, the combination of a drive member, a driven member, a front planetary gear set, a rear planetary gear set, each of said gear sets having three elements, means connecting one of the elements of said front set with said drive member and means connecting one of the elements of said rear set with said driven member, means connecting another element of said front set with another element of said rear set, means for braking both of said two last-named elements to provide reaction members for both gear sets and for causing a reverse drive of the remaining element of said front set, means including overrunning means for connecting said remaining element of said front set with the remaining element of said rear set for driving the latter element in the reverse direction and for driving said driven member through the rear gear set.

21. In a transmission, the combination of a drive member, a driven member, a front planetary gear set, a rear planetary gear set, each of said gear sets having three elements, means connecting one of the elements of said front set with said drive member and means connecting one of the elements of said rear set with said driven member, means connecting another element of said front set with another element of said rear set, means for holding the remaining element of said front set against rotation for providing a reaction member for said front set and overrunning means connecting the remaining element of said rear set with said remaining element of said front set so as to hold the said remaining element of the rear set against rotation for providing a reaction member for said rear set.

22. In a transmission, the combination of a drive member, a driven member, a front planetary gear set, a rear planetary gear set, each of said gear sets having three elements, means connecting one of the elements of said front set with said drive member and means connecting one of the elements of said rear set with said driven member, means connecting another element of said front set with another element of said rear set, means for holding the remaining element of said rear set against backward rotation for providing a reaction member for said rear set, and overrunning means connecting the remaining element of said front set with said remaining element of said rear set so as to hold the said remaining element of the front set against backward rotation for providing a reaction member for said front set, and a releasable brake for said remaining element of said front set and operative through said overrunning means to hold said remaining element of said rear set against forward rotation for providing reaction members for both of said sets.

23. In a transmission, the combination of a drive member, a driven member, a front planetary gear set, a rear planetary gear set, each of said gear sets having three elements, means connecting a first one of said elements of said front set with said drive member and means connecting a first one of said elements of said rear set with said driven member, means connecting a second of said elements of said front set with a second of said elements of said rear set, means connecting the third of said elements of said front and rear gear sets and including overrunning means, brake means for said third element of said rear gear set and acting through said overrunning means to hold said third element of said front gear set against backward rotation for a forward drive from said drive member to said driven member, a brake for said third element of said front gear set and acting through said overruning means to hold said third element of said rear gear set against forward rotation to provide a forward drive from said driven member to said drive member, and a brake for said second elements of both gear sets for providing a reverse drive through said gear sets and between said drive and driven members through said overrunning means.

24. In a transmission, the combination of a drive member, a driven member, a front planetary gear set, a rear planetary gear set, each of said gear sets having three elements, means connecting a first one of said elements of said front set with said drive member and means connecting a first one of said elements of said rear set with said driven member, means connecting a second of said elements of said front set with a second of said elements of said rear set, means connecting the third of said elements of said front and rear gear sets and including overrunning means, brake means for said third element of said rear gear set and acting through said overrunning means to hold said third element of said front gear set against backward rotation for a forward drive from said drive member to said driven member, a brake for said third element of said front gear set and acting through said overrunning means to hold said third element of said rear gear set against forward rotation to provide a forward drive from said driven member to said drive member, a brake for said second elements of both gear sets for providing a reverse drive through said gear sets and between said drive and driven members through said overrunning means, and clutch means for connecting elements of one of said gear sets for causing the gear set to rotate as a unit.

25. In a transmission, the combination of a drive member, a driven member, a front planetary gear set, a rear planetary gear set, each of said gear sets having three elements, means connecting a first one of said elements of said front set with said drive member and means connecting a first one of said elements of said rear set with said driven member, means connecting a second of said elements of said front set with a second of said elements of said rear set, means connecting the third of said elements of said front and rear gear sets and including overrunning means, brake means for said third element of said rear gear set and acting through said overrunning means to hold said third element of said front gear set against backward rotation for a forward drive from said drive member to said driven member, a brake for said third element of said front gear set and acting through said overrunning means to hold said third element of said rear gear set against forward rotation to provide a forward drive from said driven member to said drive member, a brake for said second elements of both gear sets for providing a reverse drive through said gear sets and between said drive and driven members through said overrunning means, clutch means for connecting two elements of one of said gear sets for causing the gear set to rotate as a unit, and a clutch for connecting directly said driving and driven members.

26. In a transmission, the combination of a drive member, a driven member, a front planetary gear set, a rear planetary gear set, each of said gear sets having three elements, means connecting a first one of said elements of said front set with said drive member and means connecting a first one of said elements of said rear set with said driven member, means connecting a second of said elements of said front set with a second of said elements of said rear set, means connecting the third of said elements of said front and rear gear sets and including overrunning means, brake means for said third element of said rear gear set and acting through said overrunning means to hold said third element of said front gear set against backward rotation for a forward drive from said drive member to said driven member, a brake for said third element of said front gear set and acting through said overrunning means to hold said third element of said rear gear set against forward rotation to provide a forward drive from said driven member to said drive member, a brake for said second elements of both gear sets for providing a reverse drive through said gear sets and between said drive and driven members through said overrunning means, and a clutch for locking together elements of said rear gear set for causing the gear set to rotate as a unit.

27. In a transmission, the combination of a drive member, a driven member, a hydraulic torque converter driven by said drive member, gearing disposed between said torque converter and said driven member and providing low and intermediate speed ratios between said members, said low speed ratio including an overrunning means, a clutch for connecting said drive and driven members for providing a direct drive therebetween, and a second overrunning means incorporated in a path of reaction torque transmitted by both such ratios for by-passing the said ratios when said clutch for providing direct drive is engaged.

28. In a transmission, the combination of a drive member, a driven member, a hydraulic torque converter driven by said drive member, a front planetary gear set adapted to be driven by said torque converter, a rear planetary gear set adapted to be driven by said front planetary gear set and connected with said driven member for providing a geared hydraulic low speed drive between said members, means for locking up one of said gear sets so that the elements thereof rotate together as a unit for providing a geared hydraulic intermediate speed drive between said members, and a direct drive clutch for drivably connecting together said drive and driven members for providing a direct drive between said members and eliminating any fluid drive therebetween.

29. In a transmission, the combination of a drive member, a driven member, a hydraulic torque converter, a set of gearing providing two forward geared ratios, means for connecting said hydraulic torque converter and said gearing in series so that said gearing provides one of its said ratios for providing a hydraulic geared low speed ratio drive between said members, a clutch having driving and driven parts with one part connected to the gearing and the other part connected to one of said members and engageable to complete a connection between said gearing and said members exclusive of said torque converter so that the gearing provides its other geared drive and provides a non-fluid intermediate speed drive between said members, and a second clutch having driving and drivable parts connected directly to said drive and driven members for providing a non-fluid direct drive between said members.

30. In a transmission, the combination of a drive member, a driven member, two gear sets, a hydraulic torque converter, means for connecting said hydraulic torque converter and said gear sets in series for providing a geared fluid low speed drive between said members, a clutch having driving and driven parts with one part connected to the gearing and the other part connected to one of said members and engageable to complete a connection between one of said gear sets and one of said members for an intermediate non-fluid geared drive between said members, and a second clutch having directly driving and drivable parts connected to said drive and driven members respectively for providing a non-fluid direct drive between the members.

31. In a transmission, the combination of a drive member, a driven member, a front planetary gear set, a rear planetary gear set, a hydraulic torque converter, means for connecting said sets and said hydraulic torque converter in series for providing a geared fluid low speed drive between said members, a friction clutch for connecting said drive member with said rear planetary gear set for completing a non-fluid intermediate speed ratio between said members, and a friction clutch for directly connecting said drive and driven members for providing a non-fluid direct drive between said members.

32. In a transmission, the combination of a drive member, a driven member, a front planetary gear set, a rear planetary gear set, each of said gear sets having three elements, means connecting one of the elements of said front set with said drive member and means connecting one of the elements of said rear set with said driven member, means connecting another element of said front set with another element of said rear set, means for holding the remaining element of said rear set against rotation for providing a reaction member for said rear set, and overrunning means connecting the remaining element of said front set with said remaining element of said rear set so as to hold the said remaining element of the front set against rotation for providing a reaction member for said front set and for thereby providing a low speed drive through both of said sets between said members, clutch means for locking together elements of said front set to rotate as a unit for thereby providing an intermediate speed ratio between said members, and clutch means for locking elements of said rear set to rotate as a unit for thereby providing a direct drive between said members.

33. In a transmission construction, a first planetary gearset including a ring gear, a sun gear, planet gears and a planet carrier, a second planetary gearset including a ring gear, a sun gear, planet gears and a planet carrier, a drive member for driving the ring gear of the first planetary gearset, a driven member driven by the planet carrier of the second planetary gearset, a member drivably connecting the carrier of the first gearset with the ring gear of the second gearset, locking means for locking the first gearset to rotate as a unit, brake means for preventing unwanted rotation of the sun gear of the second gearset, means including a clutch for connecting the sun gear of the first set to the sun gear of the second set, whereby said brake means may provide a reaction means for both of said planetary gearsets, and means for automatically disengaging the clutch when said locking means is engaged and the first gearset is rotating as a unit.

34. In a transmission construction, a first planetary gearset including a ring gear, a sun gear, planet gears and a planet carrier, a second planetary gearset including a ring gear, a sun gear, planet gears and a planet carrier, a drive member for driving the ring gear of the first planetary gearset, a driven member driven by the planet carrier of the second planetary gearset, a member drivably connecting the carrier of the first gearset with the ring gear of the second gearset, engageable and disengageable brake means for the sun gears to take the reaction of such sun gears and thereby cause the driven member to be driven by the drive member when said brake means is engaged and to give a neutral condition for the transmission when said brake means is disengaged, means including a clutch for connecting the sun gears, and means for automatically engaging the clutch when the drive member is running and the transmission is in such neutral condition.

35. In a transmission, a first planetary gearset and a second planetary gearset, each such gearset incorporating a ring gear member, a sun gear member, planetary gear members, and a planet carrier member, a drive part for driving the ring gear member of the first gearset, a first clutch element rotatable with the sun gear member of said first gearset, a second clutch element connectable with another member of the first gearset and engageable with the first clutch element to lock-up said first set, means for rotating as a unit the planet carrier member of the first set, the ring gear member of the second set and said second clutch element, a driven part drivable by the planet carrier member of the second set, means for preventing backward rotation of the sun gear members of both sets, when the clutch elements are disengaged, to obtain a speed ratio between the drive and driven parts, and means for preventing backward rotation of the sun gear member of the second set when the clutch elements are engaged to obtain another speed ratio.

36. In a transmission, a first planetary gearset and a second planetary gearset, each set including a ring gear member, a sun gear member, planetary gear members and a planet carrier member, a drive part for driving the ring gear member of the first set, a first clutch element, means for rotating as a unit the planet carrier member of the first set, the ring gear member of the second set and said first clutch element, a second clutch element engageable with the first clutch element, means including clutch means connecting the sun gear members of the first and second sets and also including driving means for said second clutch element, a driven part driven by the planet carrier member of the second set, means for preventing backward rotation of the sun gear member of the second set and thereby preventing backward rotation of the sun gear member of the first set when said clutch means is engaged, and automatic means for releasing said clutch means while said first and second clutch elements are engaged so as to obtain one driving speed ratio between the drive part and driven part when said first and second clutch elements are disengaged and a different speed ratio when said first and second clutch elements are engaged.

37. In a transmission incorporating a driving part, a drivable part, a hydrokinetic torque conveying device, and gearing, said device and gearing being connectable in series with each other and with said parts to provide a geared hydraulic drive for transmitting torque from the driving part to the drivable part in one angular direction, means including an overrunning clutch also connected in series with at least a part of said gearing for transmitting torque in the same angular direction from the drivable part to the driving part at a different ratio from the ratio at which torque is transmitted through said gearing from the driving part to the drivable part.

38. In a transmission incorporating a driving part, a drivable part, a hydrokinetic torque conveying device, and gearing, comprising first and second planetary gearsets in series with each other, said device and gearing being connectable in series with each other and with said parts to provide a geared hydraulic drive for transmitting torque from the driving part to the drivable part in one angular direction, each gearset including a sun gear, a ring gear, planet gears and a gear carrier, the torque conveying device having input and output portions with the input portion connected to said driving part, the output portion connected to the ring gear of the first gearset, the carrier of the first gearset being connected to the ring gear of the second gearset, the carrier of the second gearset being connected to the drivable part, and means including a releasable clutch for coupling the sun gear of the first gearset to the sun gear of the second gearset for transmitting torque in the same angular direction from the drivable part to the driving part at a different ratio from the ratio at which torque is transmitted through said gearing from the driving part to the drivable part.

39. In a transmission construction, a first planetary gearest including a ring gear, a sun gear, planet gears and a planet carrier, a second planetary gearset including a ring gear, a sun gear, planet gears and a planet carrier, a drive member for driving the ring gear of the first planetary gearset, a driven member driven by the planet carrier of the second planetary gearset, a member drivably connecting the carrier of the first gearset with the ring gear of the second gearset, locking means for locking the first gearest to rotate as a unit, brake means for preventing unwanted rotation of the sun gear of the second gearset, means including a clutch for connecting the sun gear of the first set to the sun gear of the second set, whereby said brake means may provide a reaction means for both of said planetary gearsets, means for automatically disengaging the clutch when said locking means is engaged and the first gearset is rotating as a unit, means for disengaging the brake means for allowing rotation of the sun gears and thereby eliminating a reaction member for the transmission so as to provide a neutral for the transmission, and means for automatically engaging the clutch when the drive member is running and the transmission is in neutral so as to establish a definite speed relation between the drive member and the other elements rotated thereby.

40. In a transmission, the combination of a drive member, a driven member, a hydraulic torque converter driven by said drive member, a front planetary gear set adapted to be driven by said torque converter, a rear planetary gear set adapted to be driven by said front planetary gear set and connected with said driven member for providing a geared hydraulic low speed drive between said members, means for locking up one of said gear sets so that the elements thereof rotate together as a unit for providing a geared hydraulic intermediate speed drive between said members, means for locking up both of said gear sets so that the elements thereof rotate together as a unit for providing a hydraulic fluid direct drive, and a direct drive friction clutch for by-passing the hydraulic torque converter for providing a direct drive between said drive and driven members and eliminating any fluid drive therebetween.

41. In a transmission, the combination of a drive member, a driven member, a front planetary gearset, a rear planetary gearset, a hydraulic torque converter, means for connecting said sets and said hydraulic torque converter in series for providing a geared fluid low speed drive between said members, a clutch for connecting said drive member with said rear planetary gearset for completing a nonfluid intermediate speed ratio between said members, and a friction clutch arranged in advance of both gear sets for connecting said drive and driven members for providing a nonfluid direct drive between said members.

CLIFTON R. ROCHE.

References Cited in the file of this patent

UNITED STATES PATENTS

| Number | Name | Date |
|---|---|---|
| 1,564,515 | Bower | Dec. 8, 1925 |
| 1,609,782 | Small | Dec. 7, 1926 |
| 2,105,625 | Wichtendahl | Jan. 18, 1938 |
| 2,146,369 | Dodge | Feb. 7, 1939 |
| 2,190,831 | Dodge | Feb. 20, 1940 |
| 2,205,470 | Dunn | June 25, 1940 |
| 2,221,393 | Carnegie | Nov. 12, 1940 |
| 2,229,345 | Schotz | Jan. 21, 1941 |
| 2,242,515 | Dodge | May 20, 1941 |
| 2,282,949 | Dolza | May 12, 1942 |
| 2,300,694 | Overbeke | Nov. 3, 1942 |
| 2,309,051 | Dodge | Jan. 19, 1943 |
| 2,323,601 | Hobbs | July 6, 1943 |
| 2,324,713 | McFarland | July 20, 1943 |
| 2,329,724 | Maurer | Sept. 21, 1943 |
| 2,332,593 | Nutt et al. | Oct. 26, 1943 |
| 2,351,483 | Carnagua | June 13, 1944 |
| 2,371,574 | Swennes | Mar. 13, 1945 |
| 2,374,303 | Osborne | Apr. 24, 1945 |
| 2,397,634 | Voytech | Apr. 2, 1946 |
| 2,407,289 | La Brie | Sept. 10, 1946 |
| 2,418,378 | Voytech | Apr. 1, 1947 |
| 2,516,203 | Greenlee | July 25, 1950 |

FOREIGN PATENTS

| Number | Country | Date |
|---|---|---|
| 614,340 | France | Dec. 11, 1926 |
| 530,421 | Great Britain | Dec. 11, 1940 |